(12) United States Patent
Matsuo et al.

(10) Patent No.: US 6,215,890 B1
(45) Date of Patent: Apr. 10, 2001

(54) HAND GESTURE RECOGNIZING DEVICE

(75) Inventors: Hideaki Matsuo, Fukuoka; Yuji Takata, Kodaira; Terutaka Teshima, Iizuka; Seiji Igi; Shan Lu, both of Tokorozawa; Kazuyuki Imagawa, Iizuka, all of (JP)

(73) Assignees: Matsushita Electric Industrial Co., Ltd., Osaka-fu; Communications Research Laboratory of Ministry of Posts and Telecommunications, Tokyo-to, both of (JP)

( * ) Notice: Subject to any disclaimer, the term of this patent is extended or adjusted under 35 U.S.C. 154(b) by 0 days.

(21) Appl. No.: 09/160,048

(22) Filed: Sep. 25, 1998

(30) Foreign Application Priority Data

Sep. 26, 1997 (JP) ................................... 9-261483

(51) Int. Cl.⁷ ...................................... G06F 9/36
(52) U.S. Cl. ........................ 382/103; 382/100; 382/288
(58) Field of Search ........................... 235/64.7; 384/15; 395/333, 125; 382/103, 288, 203, 100, 190, 195; 345/158, 501, 358, 351; 73/865 A; 348/459, 56; 704/3; 434/307

(56) References Cited

U.S. PATENT DOCUMENTS

| | | | |
|---|---|---|---|
| 5,714,698 | * 2/1998 | Tokioka et al. | 73/865 |
| 5,759,044 | * 6/1998 | Redmond | 434/307 |
| 5,887,069 | * 3/1999 | Sakou et al. | 382/100 |
| 5,907,364 | * 2/1999 | Furuhata | 348/459 |
| 5,917,490 | * 6/1999 | Kuzunuki et al. | 345/351 |
| 5,953,693 | * 9/1999 | Sakiyama et al. | 704/3 |
| 6,002,808 | * 12/1999 | Freeman | 382/288 |
| 6,028,960 | * 2/2000 | Graf et al. | 382/203 |
| 6,057,878 | * 5/2000 | Ogiwara et al. | 348/56 |

FOREIGN PATENT DOCUMENTS 8-115408   5/1996   (JP) ................................ G06K/9/00

OTHER PUBLICATIONS

"A Hand Gesture Recognition Method and Its Application", Tomoichi Takashi et al. (Journal of the Institute of Electronics, Information and Communication Engineers D–II, vol. J73–D–II, No. 12, pp. 1985 to 1992, Dec. 1990).

"Hand Structure Recognition Using Color Information" by Kazuyoshi Yoshino et al. (Technical Report of IEICE. PRU 94–52, pp. 39–44 (1994–10).

"A Method of Color Correction by Using the Color Space Transformation" by Jun Ikeda et al. (1995) ITE Annual Convention.

* cited by examiner

*Primary Examiner*—Matthew C. Bella
*Assistant Examiner*—M. B. Choobin
(74) *Attorney, Agent, or Firm*—Wenderoth, Lind & Ponack, LLP

(57) ABSTRACT

A hand gesture recognizing device is provided which can correctly recognize hand gestures at high speed without requiring users to be equipped with tools. A gesture of a user is stereoscopically filmed by a photographing device 1 and then stored in an image storage device 2. A feature image extracting device 3 transforms colors of the stereoscopic image data read from the image storage device 2 in accordance with color transformation tables created by a color transformation table creating device 13, and disassembles and outputs the feature image of the user in corresponding channels. A spatial position calculating device 4 calculates spatial positions of feature parts of the user by utilizing parallax of the feature image outputted from the feature image extracting device 4. A region dividing device 5 defines the space around the user with spatial region codes. A hand gesture detecting device 6 detects how the hands of the user move in relation to the spatial region codes. A category is detected first on the basis of the detected hand gesture, and then a sign language word in that category is specified.

15 Claims, 31 Drawing Sheets

FIG. 4
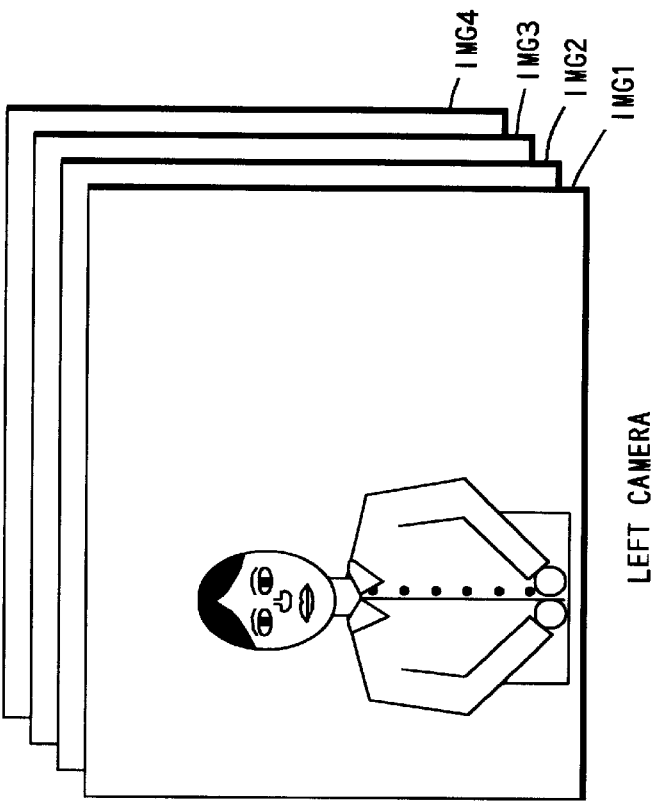
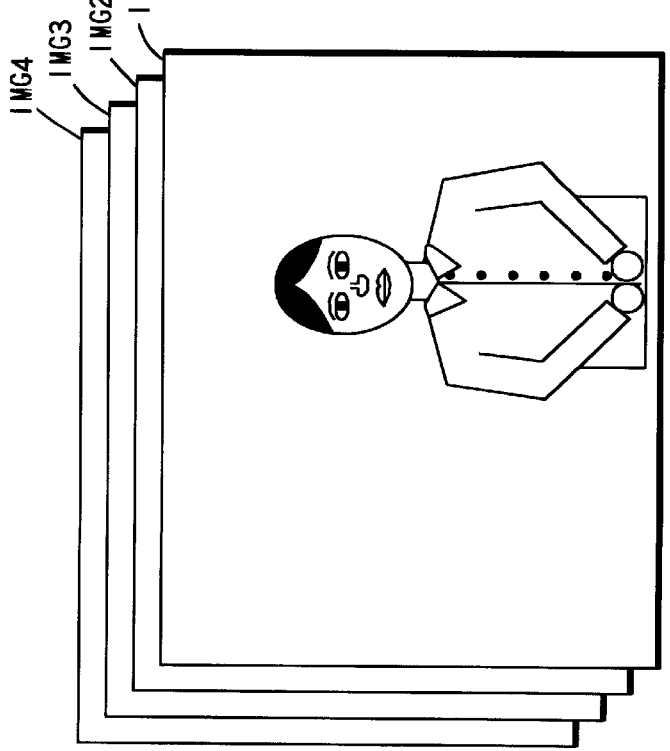

FIG. 9

| CENTER OF GRAVITY POINT / TIME | | 0 | 1 | 2 | ..... | M |
|---|---|---|---|---|---|---|
| 1 | Xw | | | | | |
|   | Yw | | | | | |
|   | Zw | | | | | |
| 2 | Xw | | | | | |
|   | Yw | | | | | |
|   | Zw | | | | | |
| ⋮ | ⋮ | | | | | |
| N | Xw | | | | | |
|   | Yw | | | | | |
|   | Zw | | | | | |

FIG. 15
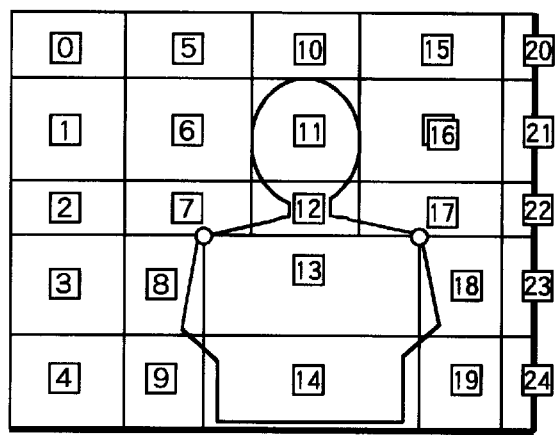
FIRST WORLD
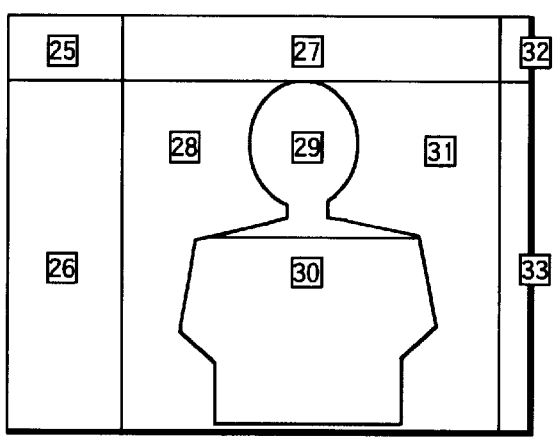
SECOND WORLD
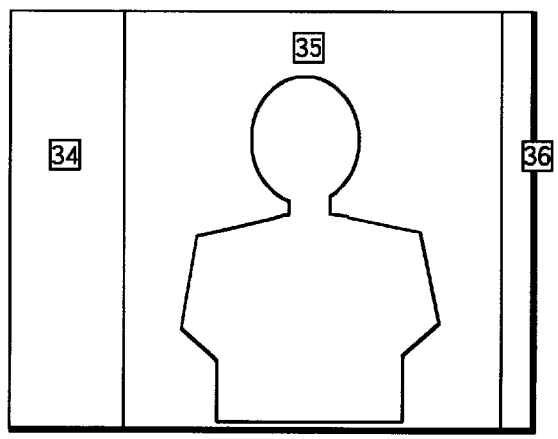
THIRD WORLD

FIG. 16

| | RIGHT | LEFT |
|---|---|---|
| 1 | 36 | 36 |
| 2 | 36 | 41 |
| ⋮ | 32 | 32 |
| ⋮ | 33 | 33 |
| ⋮ | ⋮ | ⋮ |
| ⋮ | ⋮ | ⋮ |
| | 38 | 13 |
| n | 38 | 13 |

No. 4

No. 2

F I G. 2 0
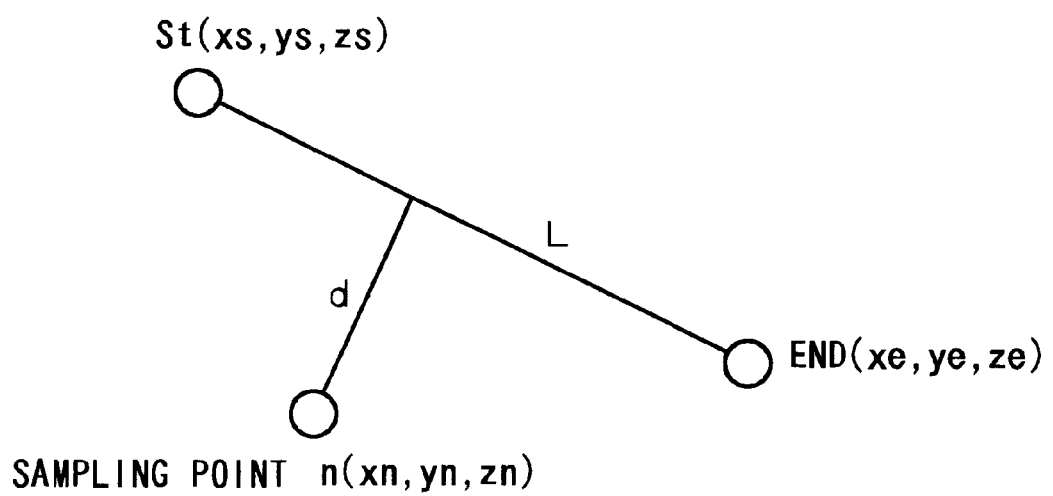

F I G. 21

| 0. STOP | 9. FORWARD | 18. BACK |
|---|---|---|
| 1. RIGHT | 10. FORWARD TO RIGHT | 19. BACK TO RIGHT |
| 2. LEFT | 11. FORWARD TO LEFT | 20. BACK TO LEFT |
| 3. UP | 12. UP FORWARD | 21. UP BACKWARD |
| 4. DOWN | 13. DOWN FORWARD | 22. DOWN BACKWARD |
| 5. UP TO RIGHT | 14. UP FORWARD TO RIGHT | 23. UP BACKWARD TO RIGHT |
| 6. UP TO LEFT | 15. UP FORWARD TO LEFT | 24. UP BACKWARD TO LEFT |
| 7. DOWN TO RIGHT | 16. DOWN FORWARD TO RIGHT | 25. DOWN BACKWARD TO RIGHT |
| 8. DOWN TO LEFT | 17. DOWN FORWARD TO LEFT | 26. DOWN BACKWARD TO LEFT |

ALL

ALMOST

POSTCARD

F I G. 2 3

| | "ALL" | | "ALMOST" | | "POSTCARD" | |
|---|---|---|---|---|---|---|
| | RIGHT HAND | LEFT HAND | RIGHT HAND | LEFT HAND | RIGHT HAND | LEFT HAND |
| MOVEMENT CODE | DOWN RIGHT → DOWN → DOWN LEFT → LEFT | DOWN LEFT → DOWN → DOWN RIGHT → RIGHT | DOWN RIGHT → DOWN → DOWN LEFT | DOWN LEFT → DOWN → DOWN RIGHT | RIGHT → DOWN → LEFT | LEFT → DOWN → RIGHT |
| START POSITION | 36 | 36 | 36 | 36 | 36 | 36 |
| END POSITION | 38 | 38 | 33 | 43 | 38 | 38 |
| INDICATED PARTICULAR PART | × | | × | | × | |
| POSITIONAL RELATION BETWEEN HANDS | LINE SYMMETRY | | LINE SYMMETRY | | LINE SYMMETRY | |
| HAND SHAPE | 2 | | 2 | | 4 | |
| ⋯ ⋯ | | | | | | |

| MOVEMENT CODE | RIGHT | DOWN | FORWARD TO RIGHT |
|---|---|---|---|
| MOVEMENT NEAR-BY CODE | FORWARD TO RIGHT | DOWN TO RIGHT | RIGHT |
| | BACK TO RIGHT | DOWN TO LEFT | FORWARD |
| | UP TO RIGHT | DOWN FORWARD | OBLIQUELY UP FORWARD TO RIGHT |
| | DOWN TO RIGHT | DOWN BACKWARD | OBLIQUELY DOWN FORWARD TO RIGHT |

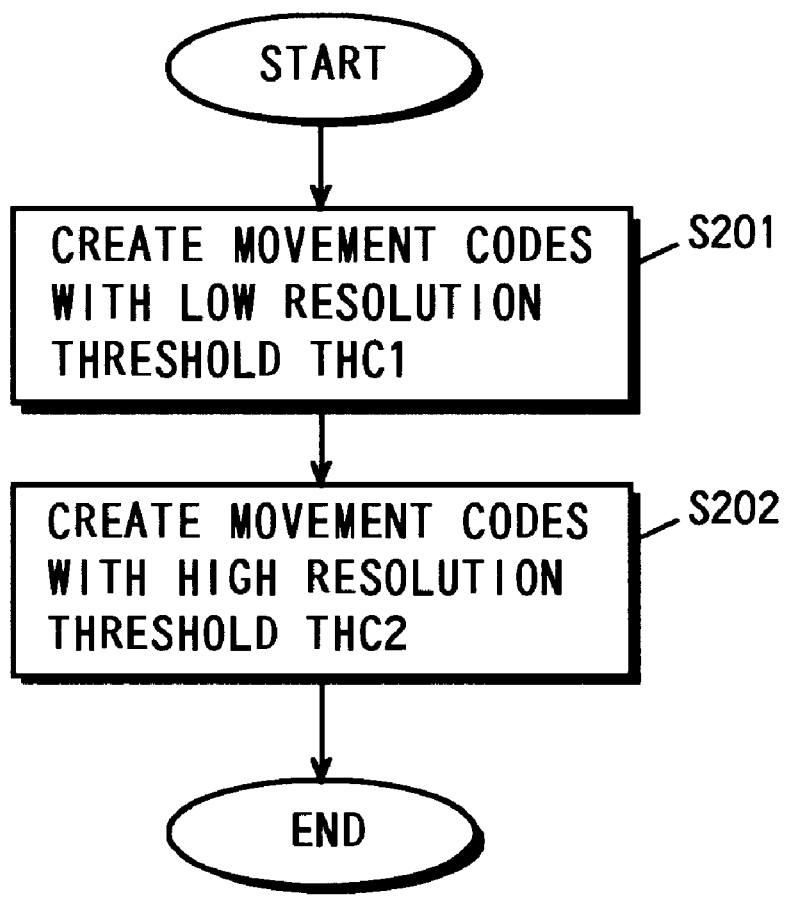

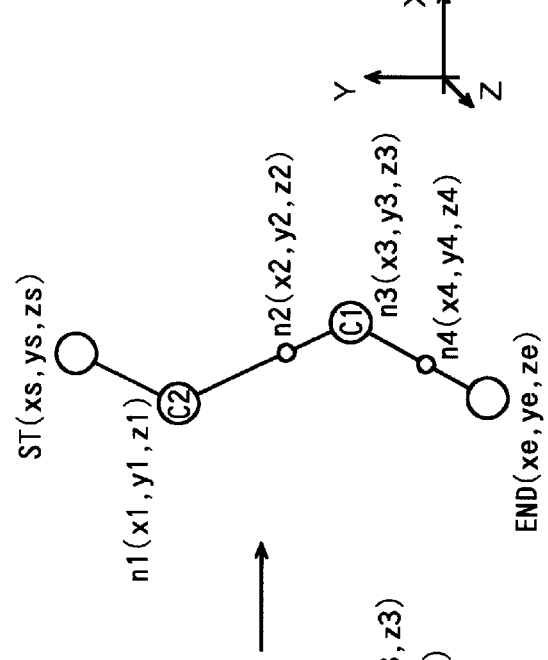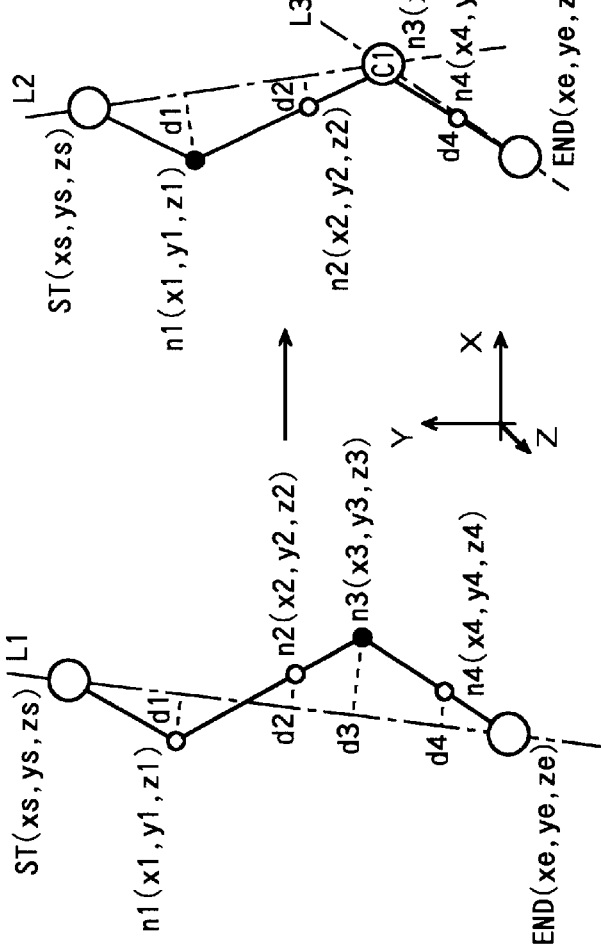
FIG. 30a
FIG. 30b
FIG. 30c

HAND GESTURE RECOGNIZING DEVICE

BACKGROUND OF THE INVENTION

1. Field of the Invention

The present invention relates to hand gesture recognizing devices, and more particularly to a hand gesture recognizing device which can automatically recognize hand gestures.

2. Description of the Background Art

Conventionally, some methods are known for recognizing hand gestures, for sign language, for example. A first method is to measure movement of the body by sensing movement of a sensor attached to the body. (For example, refer to "Hand Gesture Recognizing Method and Applications," Yuichi Takahashi et al., The Institute of Electronics Information and Communication Engineers, Papers D-2 Vol.J73-D-2 No.121990, n.pag., and Japanese Patent Laying-Open No.8-115408.) According to a second method, the hands are sensed by a camera with multi-colored gloves put on the hands so as to measure movements of the fingers by extracting information about the outline of the hands through color information. (For example, refer to "Hand Structure Recognition Using Color Information," Kazuyoshi Yoshino et al., The Institute of Electronics Information and Communication Engineers, Technical Research Paper PRU94-52, pp.39–43) Further, in a third method, variation in the quantity of light emitted from an optical fiber attached to the body is sensed to measure variation of the finger shape (refer to Japanese Patent Laying-Open No.8-115408).

However, the first to third methods described above require that users be equipped with a sensor, gloves, or an optical fiber, which gives an uncomfortable feeling to the users and limits movements of the users. Further, the conventional methods which recognize movements by using absolute coordinate values of body parts obtained in advance from a particular person are susceptible to recognition errors due to differences in body size among actual users, movement of the body during performance, and the like. It may be suggested that coordinate values of the body parts be recorded for a plurality of users. However, this method will encounter the problem that an enormous amount of data must be recorded in proportion to the number of users. Moreover, in the conventional methods, measured hand movements are compared with hand movements corresponding to hand gesture words recorded in a dictionary, word by word, for recognition. This raises the problem that the time required for recognition exponentially increases as the number of words to be recognized increases.

SUMMARY OF THE INVENTION

Accordingly, an object of the present invention is to provide a hand gesture recognizing device which can recognize and translate hand gestures without requiring that users be equipped with some tools.

Another object of the present invention is to provide a hand gesture recognizing device which can correctly recognize and translate hand gestures without error, regardless of differences in body size among users, movements of the body during performance, and the like.

Still another object of the present invention is to provide a hand gesture recognizing device which can achieve recognizing and translating processing in a short time even with an increased number of words to be recognized.

A first aspect is directed to a hand gesture recognizing device for recognizing hand gestures performed by a user comprises:

photographing means having at least two cameras for stereoscopically taking pictures of the user;

image storage means for storing stereoscopic image data of the user outputted from the photographing means at arbitrary sampling interval;

feature image extracting means for taking out the stereoscopic image data in order from the image storage means, extracting feature image showing body features of the user from each stereoscopic image data, and disassembling and outputting the feature image in a plurality of channels;

spatial position calculating means for detecting three-dimensional spatial positions of body parts of the user on the basis of parallax of the feature image outputted from the feature image extracting means;

region dividing means for dividing a space surrounding the user into a plurality of regions related to the body of the user on the basis of the parallax of the feature image outputted from the feature image extracting means;

hand gesture detecting means for detecting how three-dimensional spatial positions corresponding to the hands of the user, in the three-dimensional spatial positions of the body parts calculated by the spatial position calculating means, move with respect to the regions divided by the region dividing means;

hand gesture word determining means for determining a corresponding hand gesture word on the basis of the movement of the hands detected by the hand gesture detecting means; and output means for outputting the result determined by the hand gesture word determining means in a form which can be recognized by an operator.

As stated above, according to the first aspect, the device extracts features of body parts from stereoscopic image data obtained by taking pictures of a user and detects three-dimensional movement of a hand gesture by utilizing parallax of the stereoscopic image data, and recognizes the hand gesture word on the basis of the detected result. This allows the hand gesture to be recognized without requiring the user to be equipped with any tools, and without contact. The device further divides the space surrounding the user into a plurality of regions corresponding to the body of the user and detects how the three-dimensional spatial positions of the user's hands move with respect to the divided regions. Accordingly it can always make proper recognition in accordance with the user's body, independent of body size of the user and movement of the body of the user, which remarkably improves the recognizing accuracy.

According to a second aspect, in the first aspect, the feature image extracting means outputs the feature image in the corresponding channels on the basis of color information of individual picture elements forming the stereoscopic image data.

According to a third aspect, in the second aspect, the feature image extracting means sets a color transformation table for each channel on the basis of a color to be extracted and a color not to be outputted which are specified by the operator, transforms the color information of the individual picture elements forming the stereoscopic image data according to the color transformation table, and discriminates values transformed according to the color transformation table with a predetermined threshold to output the feature image in the corresponding channels.

According to a fourth aspect, in the first aspect, the region dividing means estimates a position of a body part which does not appear in the feature image on the basis of the three-dimensional spatial positions of the body parts calculated by the spatial position calculating means and divides the space surrounding the user into still smaller regions on the basis of the estimated position.

As stated above, according to the fourth aspect, a position of a body part which does not appear in the feature image is estimated and the space surrounding the user is divided into still smaller regions on the basis of the estimated position, which enables more accurate recognition.

According to a fifth aspect, in the first aspect, the region dividing means calculates a difference value between the feature images adjacent in time and performs the process of dividing regions only when that difference value is equal to or larger than a predetermined threshold.

As stated above, according to the fifth aspect, the device divides regions only when a difference value between feature images adjacent in time reaches or exceeds a predetermined threshold, which reduces the calculating load for the region dividing.

According to a sixth aspect, in the first aspect, the region dividing means divides a space extending in front and rear of the body of the user into a plurality of layers and further divides each of the layers into a plurality of regions.

According to a seventh aspect, in the sixth aspect, the region dividing means divides the layers into different numbers of regions.

According to an eighth aspect, in the seventh aspect, the region dividing means divides the layers into regions of numbers decreasing as it goes forward, seen from the body of the user, from the backmost layer to the front layer.

According to a ninth aspect, in the first aspect, a plurality of hand gesture words as objects of recognition are classified into a plurality of categories in advance, and wherein the hand gesture word determining means comprises a category dictionary in which features of movements common among hand gesture words belonging to the respective categories are previously recorded for each category, a word dictionary in which more detailed features of the movements of individual hand gesture words are stored for each category, category detecting means for detecting which of the categories the movement of the hands detected by the hand gesture detecting means belongs to, out of the category dictionary, and word recognizing means for recognizing which of the hand gesture words belonging to the category detected by the category detecting means the movement of the hands detected by the hand gesture detecting means corresponds to.

As stated above, according to the ninth aspect, hierarchically checking hand gesture words allows the recognition to be achieved in a shorter time as compared with the conventional method of calculating the degrees of similarity for every single word.

According to a tenth aspect, in the ninth aspect, the word recognizing means outputs, as a recognition result, one hand gesture word having the highest degree of similarity with respect to the movement of the hands detected by the hand gesture detecting means from among the hand gesture words belonging to the category detected by the category detecting means.

According to an eleventh aspect, in the ninth aspect, the word recognizing means outputs, as a recognition result, one or a plurality of hand gesture words having a degree of similarity equal to or higher than a given threshold with respect to the movement of the hands detected by the hand gesture detecting means from among the hand gesture words belonging to the category detected by the category detecting means.

According to a twelfth aspect, in the first aspect, the hand gesture recognizing device further comprises start-of-gesture informing means for informing the user when to start a hand gesture.

As stated above, according to the twelfth aspect, it is possible to inform a user when to start a hand gesture so that the user can act without anxiety.

According to a thirteenth aspect, in the first aspect, the hand gesture detecting means extracts a sampling point at which direction of movement largely changes as a control point from among sampling points showing three-dimensional spatial positions detected between a start point and an end point of the movement and represents the hand movement of the user by using the start point, the end point, and the control point.

As stated above, according to the thirteenth aspect, the device extracts a sampling point at which the direction of movement largely changes as a control point from among a plurality of sampling points existing between the start point and the end point of the movement and represents the movement of the user's hands by using these start point, end point and control point. Accordingly, the hand movement of the user can be represented more simply as compared with the method in which the hand movement of the user is represented by using all sampling points, and as the result, the hand gesture words can be determined more quickly.

According to a fourteenth aspect, in the thirteenth aspect, the hand gesture detecting means detects, a sampling point existing between the start point and the end point, having a maximum distance, which is equal to or larger than a predetermined threshold, to a straight line connecting the start point and the end point, a sampling point existing between the start point and an adjacent control point, having a maximum distance, which is equal to or larger than the predetermined threshold, to a straight line connecting the start point and the adjacent control point, a sampling point existing between the end point and an adjacent control point, having a maximum distance, which is equal to or larger than the predetermined threshold, to a straight line connecting the end point and the adjacent control point, and a sampling point existing between adjacent two control points, having a maximum distance, which is equal to or larger than the predetermined threshold, to a straight line connecting these two control points, and defines these detected sampling points as the control points.

As stated above, according to the fourteenth aspect, since the control points are extracted by using a predetermined threshold, the precision in representing movement can be freely changed by changing the threshold.

According to a fifteenth aspect, in the fourteenth aspect, the hand gesture detecting means hierarchically detects the control points by using a plurality of thresholds to hierarchically represent the hand movement of the user, and the hand gesture word determining means hierarchically specifies a corresponding hand gesture word on the basis of the hand movement of the user hierarchically represented by the hand gesture detecting means.

As stated above, according to the fifteenth aspect, hierarchically determining the hand gesture word enables recognition to be made in a shorter time as compared with the conventional method in which degrees of similarity are calculated for all words.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing an example of image frames stored in a image storage device 2 in FIG. 1

FIG. 9 is a diagram showing the structure of a three-dimensional spatial position table in which three-dimensional spatial positions of blobs calculated by a spatial position calculating device 4 of FIG. 1 are recorded.

FIG. 15 is a diagram showing another example of definition of the spatial region codes in the first to third worlds.

FIG. 16 is a diagram showing a region transition table, which contains variation in time of the spatial region codes for blobs corresponding to hands produced when a user performs a sign language gesture corresponding to "postcard."

FIG. 20 is a schematic diagram generally showing a distance from a sampling point to a straight line.

FIG. 21 is a diagram showing a movement code table which is referred to when specifying movement codes.

FIG. 23 is a diagram showing examples of feature information about sign language words belonging to the first category recorded in a word dictionary 11 of FIG. 1.

FIG. 28 is a flowchart showing the operation of detecting movement codes executed in a hand gesture detecting device in the second embodiment of the present invention.

FIGS. 30a to 30c are diagrams showing examples of hand movement loci used to describe an operation performed to detect control points by using a high resolution threshold THC2 in the second embodiment of the present invention.

DESCRIPTION OF THE PREFERRED EMBODIMENTS

First Embodiment

Figure 1:
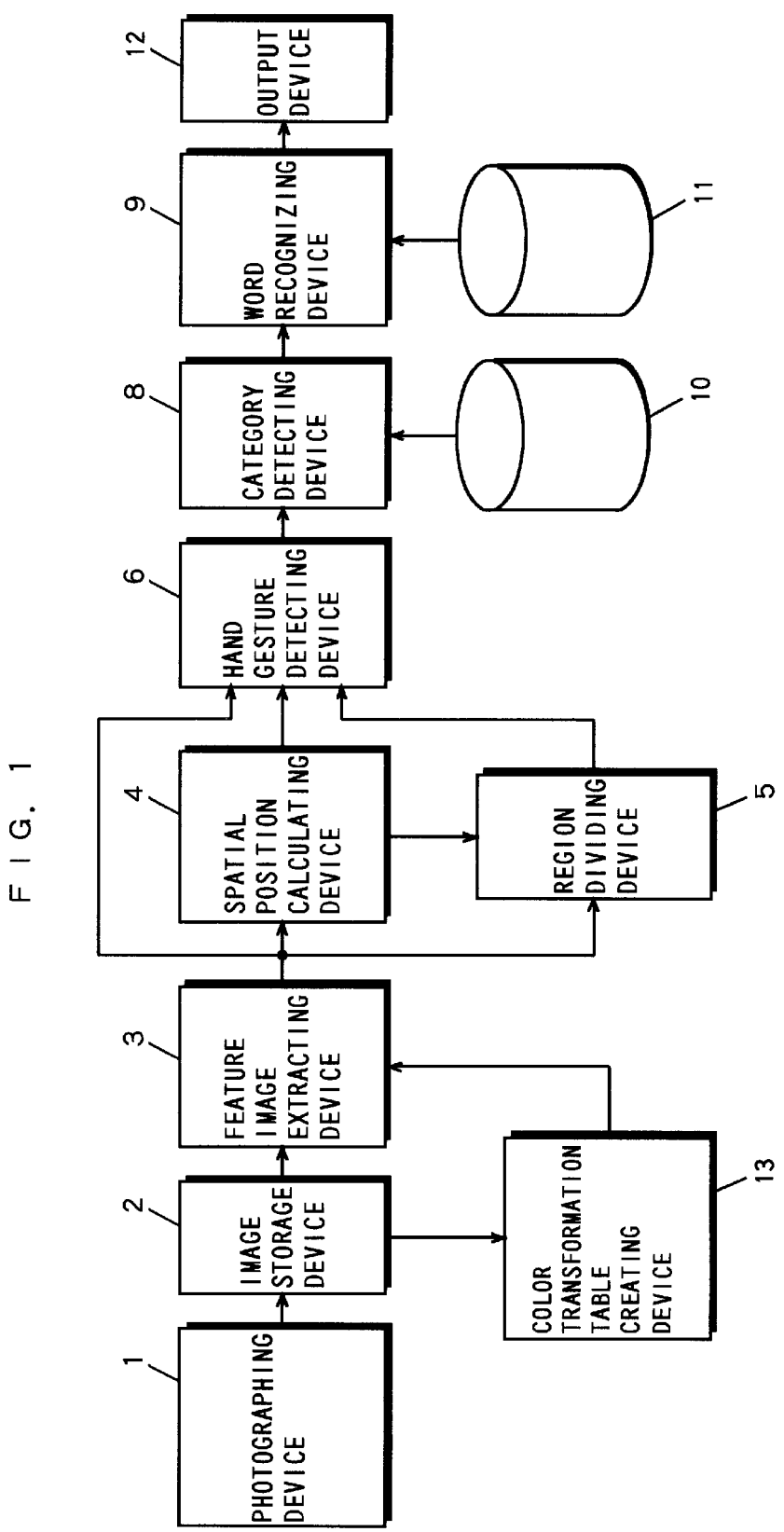
FIG. 1 is a block diagram showing the structure of a sign language recognizing device according to a first embodiment of the present invention.

FIG. 1 is a block diagram showing a structure of a sign language recognizing device according to a first embodiment of the present invention. In FIG. 1, the sign language recognizing device of this embodiment includes a photographing device 1, an image storage device 2, a feature image extracting device 3, a spatial position calculating device 4, a region dividing device 5, a hand gesture detecting device 6, a category detecting device 8, a word recognizing device 9, a category dictionary 10, a word dictionary 11, an output device 12, and a color transformation table creating device 13.

The photographing device 1 includes a plurality of TV cameras, which takes stereoscopic pictures of movements of a user. The image storage device 2 stores a plurality of frames of stereoscopic image data outputted from the photographing device 1. The color transformation table creating device 13 creates three color transformation tables respectively corresponding to first to third channels on the basis of colors of picture elements specified on a representative image selected by an operator from among the plurality of frames of stereoscopic image data stored in the image storage device 2. The feature image extracting device 3 reads the stereoscopic image data in order from the image storage device 2 and transforms the color data of the picture elements in the read stereoscopic image data according to the color transformation tables created by the color transformation table creating device 13 to extract a stereoscopic feature image showing body features of the user, which is disassembled and outputted in the first to third channels.

The spatial position calculating device 4 calculates three-dimensional spatial positions of blobs (images each regarded as a lump of images) included in the individual channels by utilizing parallax of the stereoscopic images outputted in the individual channels from the feature image extracting device 4. The region dividing device 5 divides the three-dimensional space surrounding the body on the basis of the stereoscopic feature image outputted from the feature image extracting device 3 and the three-dimensional spatial positions of the blobs calculated in the spatial position calculating device 4 and creates spatial region codes for defining the divided regions. The hand gesture detecting device 6 detects how the blobs corresponding to the hands move in the space in relation to the spatial region codes created by the region dividing device 5 on the basis of the stereoscopic image outputted from the feature image extracting device 4, the three-dimensional spatial positions of the blobs calculated in the spatial position calculating device 4, and the spatial region codes created by the region dividing device 5.

The category dictionary 10 contains features of sign language gesture s classified into categories (groups each including similar sign language gestures). The category detecting device 8 detects which of the categories included in the category dictionary 10 features of the sign language gesture detected by the hand gesture detecting device 6 belong to. The word dictionary 11 contains features of gestures for sign language words belonging to the individual categories. The word recognizing device 9 detects which of the sign language words belonging to the category detected by the category detecting device 8 the features of the sign language gesture detected by the hand gesture detecting device 6 correspond to. The output device 12 outputs the result detected by the word recognizing device 9 in the form of image, letters, speech, etc.

Figure 2:
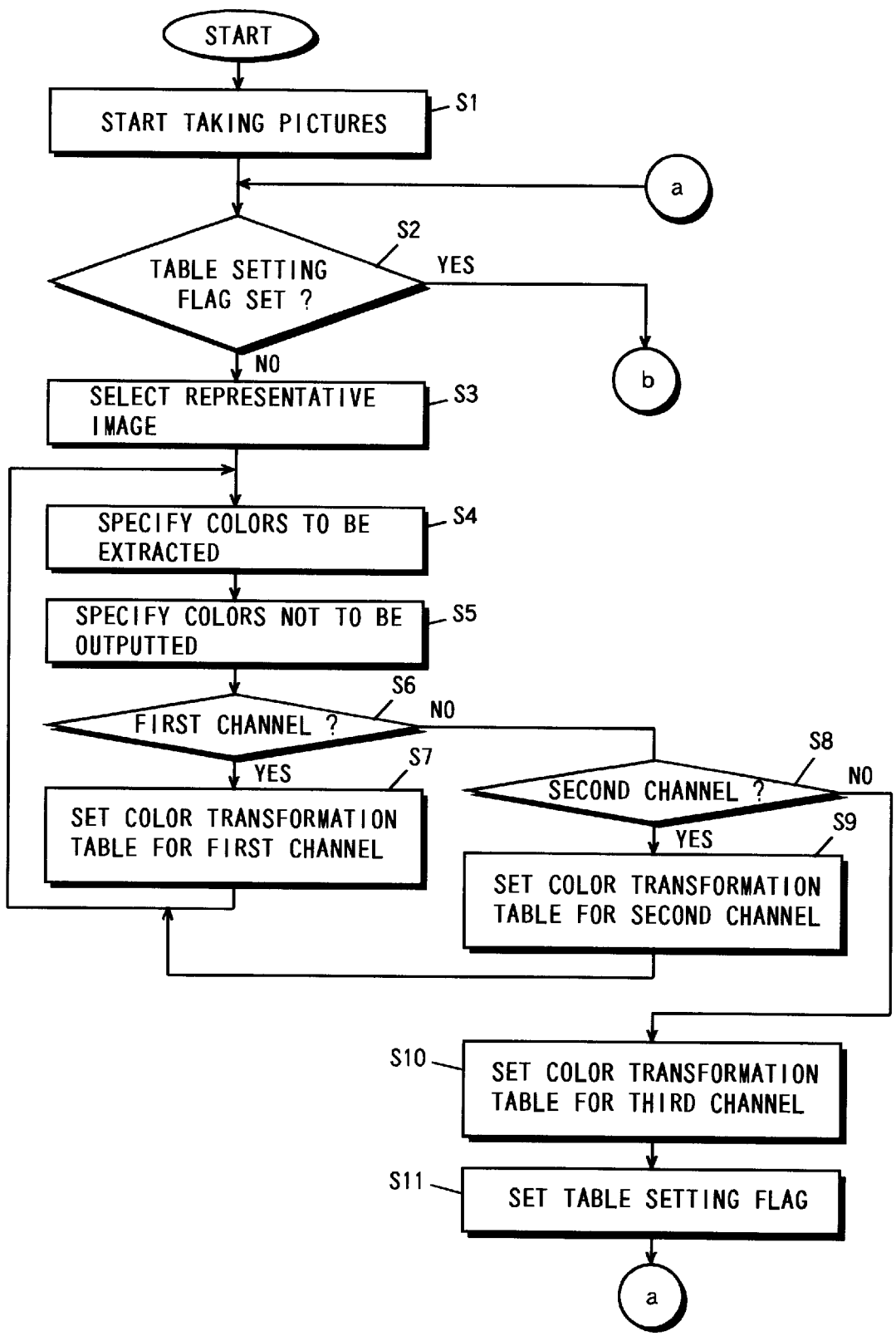
FIG. 2 is a flowchart showing the first half of operation of the sign language recognizing device of FIG. 1.
Figure 3:
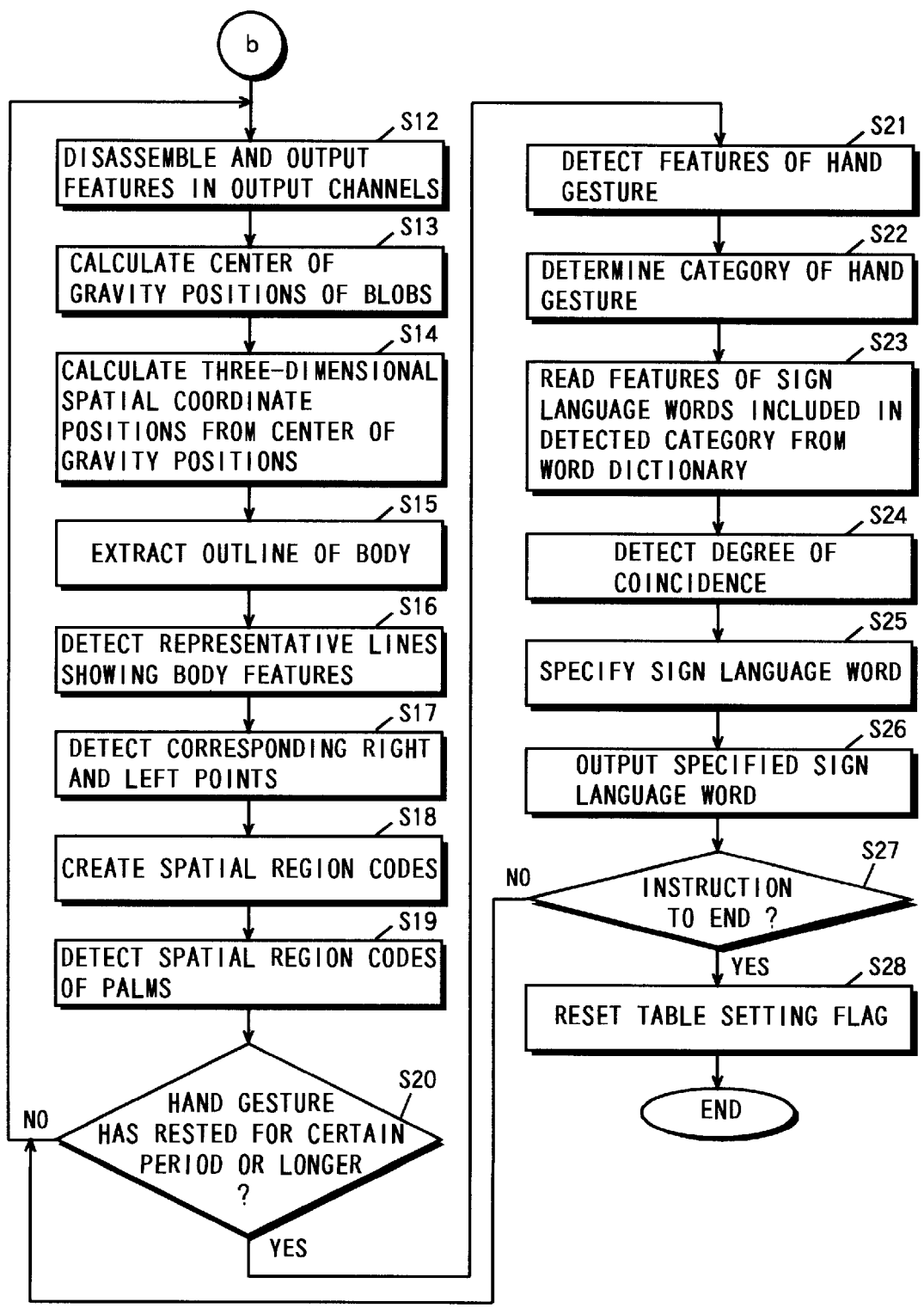
FIG. 3 is a flowchart showing the latter half of the operation of the sign language recognizing device of FIG. 1.

FIGS. 2 and 3 are flowcharts showing the operation of the embodiment shown in FIG. 1. Referring to FIGS. 2 and 3, the operation of this embodiment will now be described.

First, the photographing device 1 starts taking pictures (Step S1). In this operation, two TV cameras on the right and left sides included in the photographing device 1 stereoscopically sense the upper half of the body of the user at different angles. The stereoscopic image data outputted from the photographing device 1 is stored into the image storage device 2 at a proper sampling cycle. In the standard case, the image storage device 2 stores the stereoscopic image data at a sampling interval of 1/30 second according to the NTSC standard. However, it is possible to store the stereoscopic image data at another sampling interval (e.g., 1/10 sec or 1/5 sec) by changing the sampling cycle. As shown in FIG. 4, individual frames of the stereoscopic image data stored in the image storage device 2 are serially numbered in a time series manner (as IMG1, IMG2, . . . ).

Figure 5:
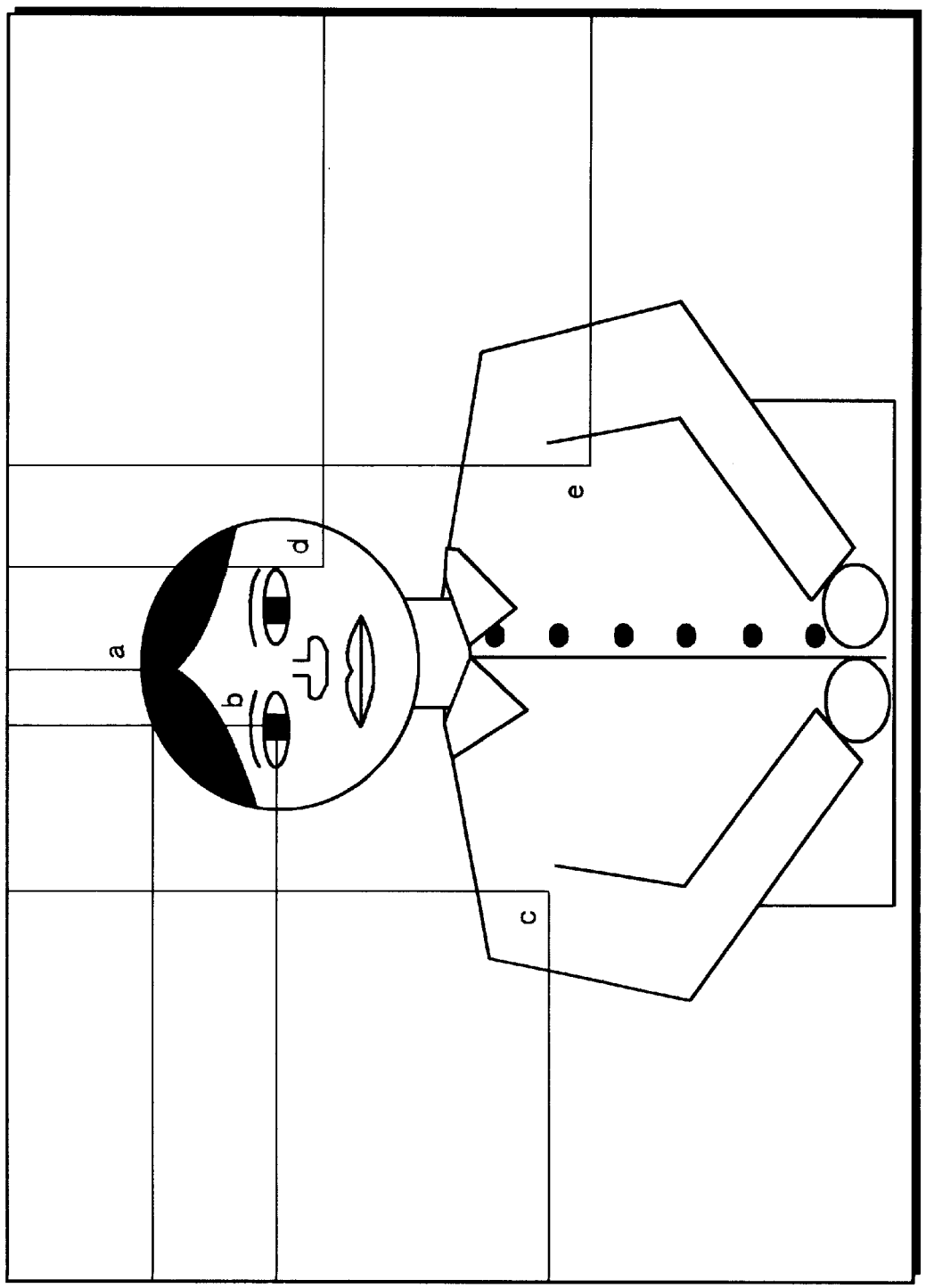
FIG. 5 is a diagram showing an example of a representative image stored in a color transformation table creating device 13 of FIG. 1.

Next, the color transformation table creating device 13 determines whether a table setting flag (not shown) provided therein is set (Step S2). As will be described later, this table setting flag is set when color transformation tables are set (see Step S11). At first, the color transformation tables are not set and hence the table setting flag is in a reset state, the process therefore proceeds to Step S3. In Step S3, as shown in FIG. 5, the operator selects an arbitrary one frame of image data from among the plurality of frames of stereoscopic image data stored in the image storage device 2 as a representative image for feature extraction. While the image data outputted from the photographing device 1 is stored in the image storage device 2, it is also displayed in a display device not shown. The operator gives selecting instruction to the color transformation table creating device 13 with proper timing while watching the displayed contents in the display device to specify the representative image. The color transformation table creating device 13 then reads the image data of the operator-selected representative image from the image storage device 2. Subsequently, the color transformation table creating device 13 performs the process of setting the color transformation tables (Steps S4 to S11). The processing performed in Steps S4 to S11 will now be described in detail.

Figure 6:
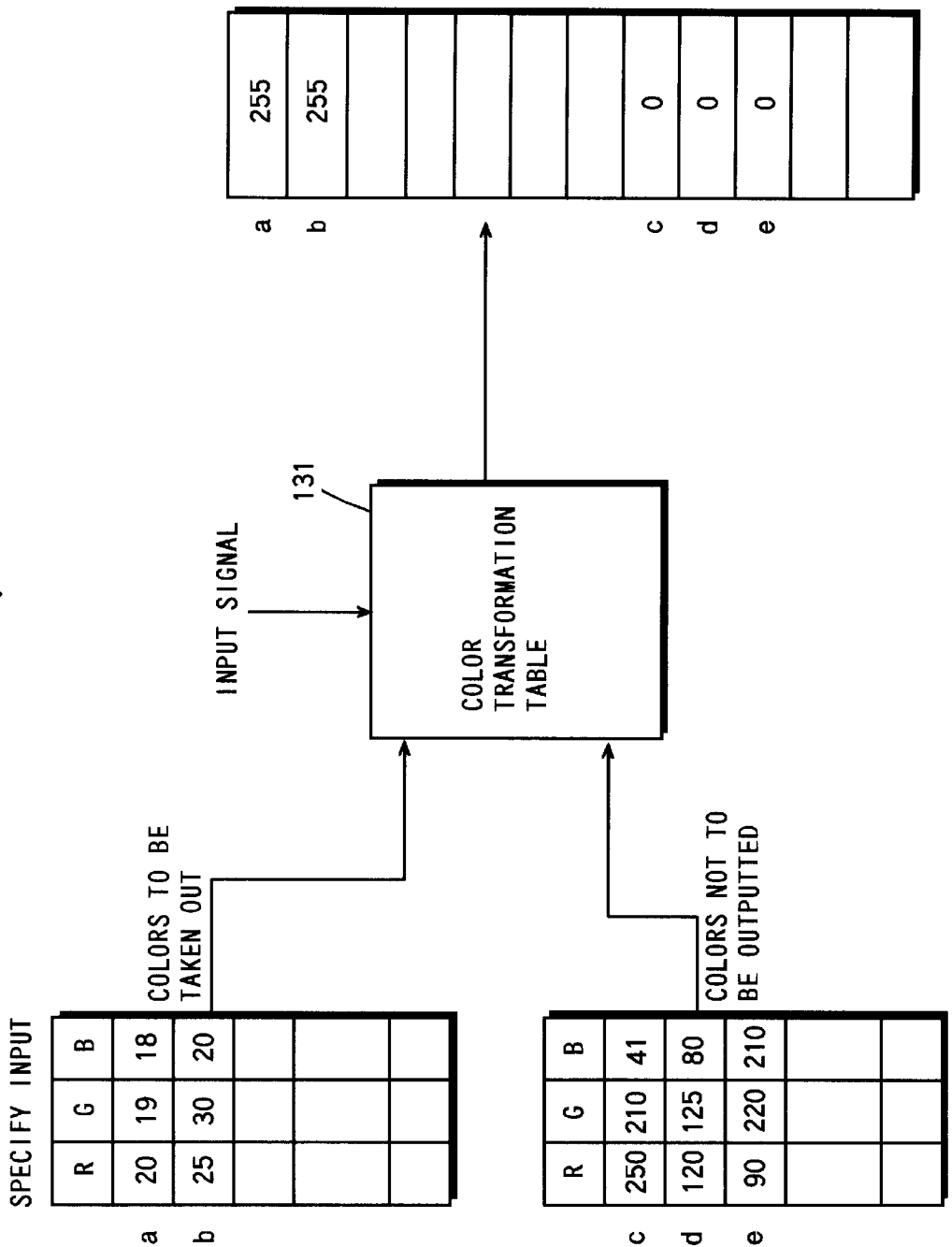
FIG. 6 is a diagram showing a color transformation table contained in a color transformation table creating device 13 of FIG. 1.

The color transformation table creating device 13 contains color transformation tables 131, like that shown in FIG. 6, for three channels. Set in these color transformation tables 131 are transform values corresponding to all color positions in the RGB color space. Since each of R, G, B is represented with 8 bits (0 to 255) in this embodiment, the color transformation table 131 may have transform values corresponding to 16777216 (=256×256×256) colors. However, as this configuration requires a large amount of data, the RGB color space is roughly sectioned into meshes in practice, with transform values allotted to its individual meshes. The transform values include 0 to 255. That is to say, whatever RGB value is given as an input signal, the color transformation table 131 transforms the RGB value into one of 0 to 255. That is to say, the color transformation table 131 is used to output only particular colors specified by the operator into the first to third channels.

In the operation described below, it is assumed that colors close to black as those of the eyes and hair of the head are outputted in the first channel, skin colors as those of the face and hands are outputted in the second channel, and colors occupying the entire body as those of clothes are outputted in the third channel. While a common TV camera outputs RGB signals, it is assumed here that the first channel corresponds to the R signal, the second channel to the G signal and the third channel to the B signal. Actually, however, the first channel may correspond to the G or B signal.

First, the operator specifies the first channel as the output channel. The operator then specifies colors to be taken out into the first channel (Step S4). In this case, the operator specifies the part "a" in the hair and the part "b" in the eye in the representative image (FIG. 5) displayed in a display device (not shown) by using a pointing device, such as a mouse. Thus, the operator can specify not only one portion of the representative image, but also a plurality of portions. In response, the color transformation table creating device 13 determines the RGB values representing the colors of the specified parts a and b as colors to be taken out in the first channel and sets the maximum value "255" in the corresponding color space regions in the color transformation table 131 for the first channel (see FIG. 6). The color information acquired at this time may be of any of HSI system, YUV, YIQ. Next, the operator specifies colors not to be outputted into the first channel (Step S5). In this case, the operator specifies the parts "c" and "e" in the clothes and the part "d" in the face in the representative image (FIG. 5) by using a mouse or the like. At this time, too, the operator can specify a plurality of portions. In response, the color transformation table creating device 13 determines the RGB values representing the colors of the specified parts c, d and e as colors not to be outputted in the first channel and sets the minimum value "0" in the corresponding color space regions in the first-channel color transformation table 131. Next, the color transformation table creating device 13 determines that the output channel specified at this time is the first channel (Step S6), and performs given interpolating operation between the colors specified in Step S4 and the colors specified in Step S5 to calculate transform values for colors not specified in Step S4 and S5 and sets the calculated transform values in the corresponding color space regions in the first-channel color transformation table 131 (Step S7).

Here, the given interpolating operation performed in Step S7 above may be the color space transformation operation described in "A Method of Color Correction by using the Color Space Transformation," Jun Ikeda et al., The Institute of Image Information and Television Engineers, 1995 annual meeting, n.pag., for example. This transformation operation will now be described.

Now it is assumed that i=1, 2, ..., n, and a specified color before color correction in the RGB coordinate system is represented as $$Si=(ri, gi, bi)$$

As for a color to be extracted in the first channel, the color after correction is taken as $$Si_0'=(255, 0, 0)$$

As for a color not to be extracted in the first channel, the color after correction is taken as $$Si_1'=(0, 0, 0)$$

Then when the amount of correction is taken as Mi, the following equation (1) holds:

$$Mi = Si' - Si \qquad (1)$$
$$= S'(Si) - Si$$
$$= M(Si)$$

With the equation (1) as a boundary condition, the following functional equation (2) using the distance from the specified point Si is solved to determine the color after correction S'=(a, 0, 0) [a=0 to 255] for an arbitrary color S=(r, g, b).

$$M(S)=f(|S-Si|, \ldots |S-sn|) \qquad (2)$$

The equation (2) can be solved by various methods. For example, when the minimum distance between the arbitrary color and the color to be extracted is taken as $$Si_0 = \min(|Si_0'-S|)$$

and the minimum distance between the arbitrary color and the color not to be extracted is taken as $$Si_1 = \min(|Si_1'-S|)$$

then the color after correction S'=(A, 0, 0) can be obtained as shown by the following equation (3). Note that A=0 to 255.

$$A=(255 \times Si_1)/(Si_0-Si_1) \qquad (3)$$

While the equation (3) above solves the equation (2) by linear interpolation, the equation (2) can be solved by nonlinear interpolation, as well.

Next, the operator specifies the second channel as the output channel and specifies colors to be taken out and not to be outputted in the second channel (Steps S4 and S5). In this case, the operator specifies the part "d" in the face in the selected representative image (FIG. 5) with a mouse or the like as a color to be taken out in the second channel. The operator also specifies the parts other than the face as colors not to be outputted in the second channel by using a mouse or the like. In response, the color transformation table creating device 13 sets the maximum value "255" and the minimum value "0" in the corresponding color space regions in the second-channel color transformation table 131 (see FIG. 6). Next, the color transformation table creating device 13 determines that the output channel specified at this time is the second channel (Step S8) and performs given interpolating operation between the color specified in Step S4 and the colors specified in Step S5 to calculate transform values for colors not specified in Steps S4 and S5 and set the transform values obtained by calculation in the corresponding color space regions in the second-channel color transformation table 131 (Step S9).

Next, the operator specifies the third channel as the output channel and specifies colors to be taken out and not to be outputted in the third channel (Steps S4 and S5). In this case, the operator specifies the parts "c" and "e" in the clothes in the representative image (FIG. 5) as colors to be taken out in the third channel by using a mouse or the like. The operator also specifies a part other than the clothes (e.g., the background part) as colors not to be outputted in the third channel by using a mouse or the like. In response, the color transformation table creating device 13 sets the maximum value "255" and the minimum value "0" in the corresponding color space regions in the third-channel color transformation table 131 (see FIG. 6). Next, the color transformation table creating device 13 determines that the output channel specified at this time is the third channel (Step S8) and performs given interpolating operation between the colors specified in Step S4 and the colors specified in Step S5 to calculate transform values for colors not specified in Steps S4 and S5 and set the calculated values in the corresponding color space regions in the third-channel color transformation table 131 (Step S10).

Finally, the color transformation table creating device 13 sets the table setting flag (Step S11) and ends the processing of setting the color transformation tables 131.

Next, the feature image extracting device 3 transforms the picture elements included in the stereoscopic image data read from the image storage device 2 by using the three color transformation tables 131 created by the color transformation table creating device 13. The feature image extracting device 3 then outputs only those provided with transform values equal to or larger than a predetermined threshold.

Figure 7A:
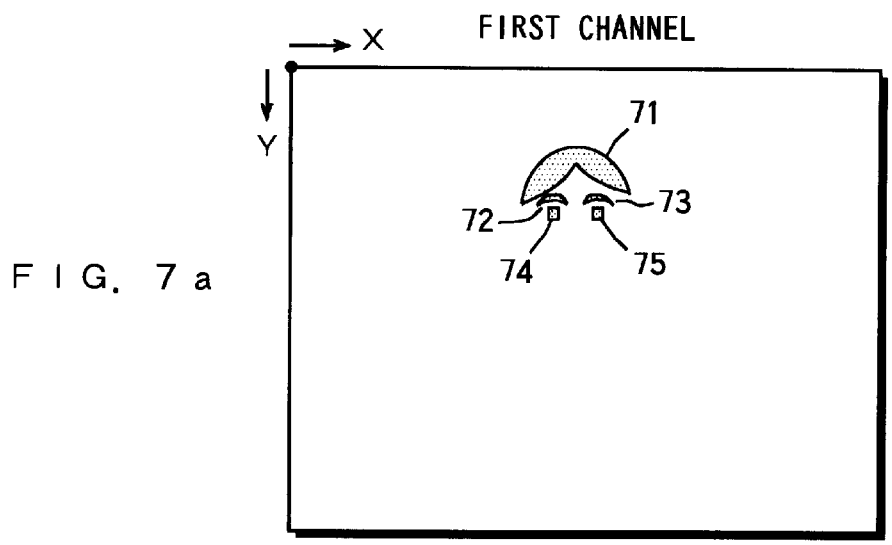
FIGS. 7a to 7c are diagrams showing examples of feature images outputted in the corresponding channels from a feature image extracting device 3 of FIG. 1.
Figure 7B:
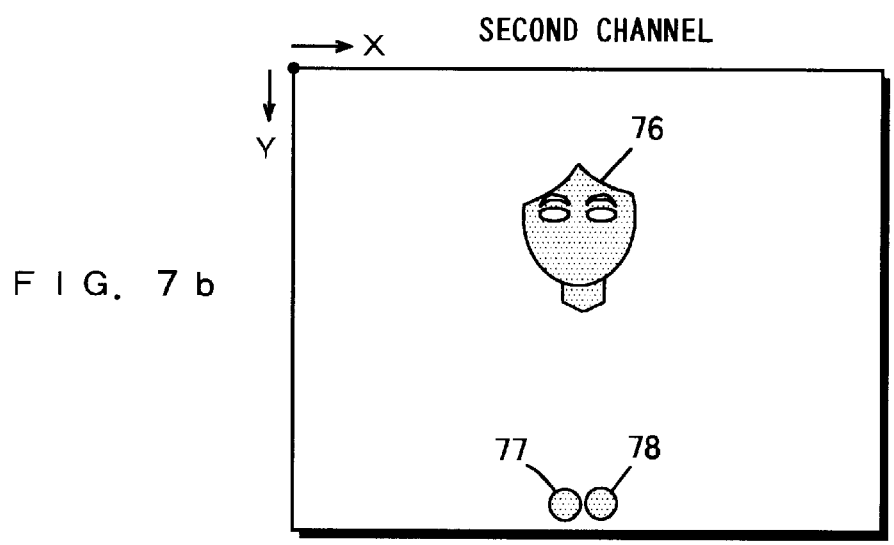
Figure 7C:
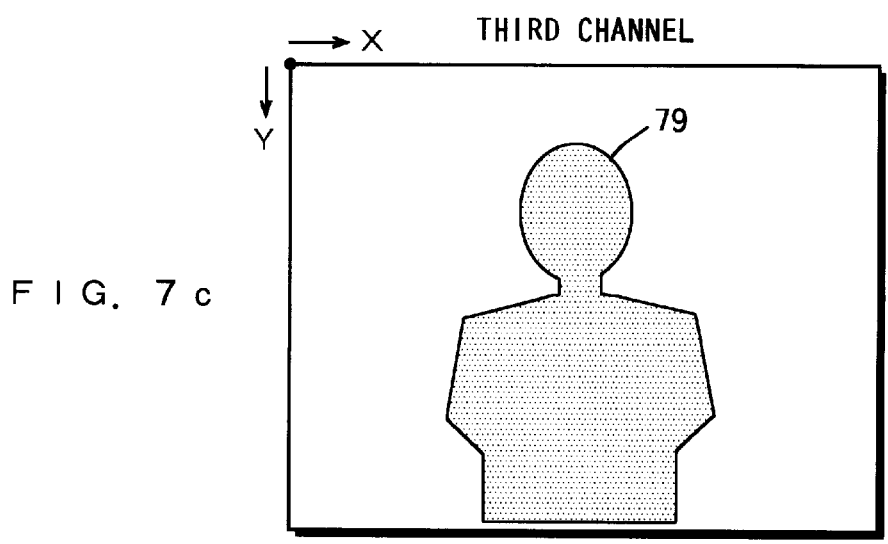

Thus the stereoscopic feature images (see FIGS. 7a to 7c) showing the body features of the present user are outputted in the form disassembled in the first to third channels (Step S12). FIG. 7a shows the feature image outputted in the first channel, which includes, as blobs (image treated as a lump of image), a blob 71 corresponding to the hair of the head, blobs 72 and 73 corresponding to the eyebrows, and blobs 74 and 75 corresponding to the eyes. FIG. 7b shows the feature image outputted in the second channel, which includes a blob 76 corresponding to the face, and blobs 77 and 78 corresponding to the hands. FIG. 7c shows the feature image outputted in the third channel, which includes a blob 79 corresponding to all of the region of the body.

Figure 8:
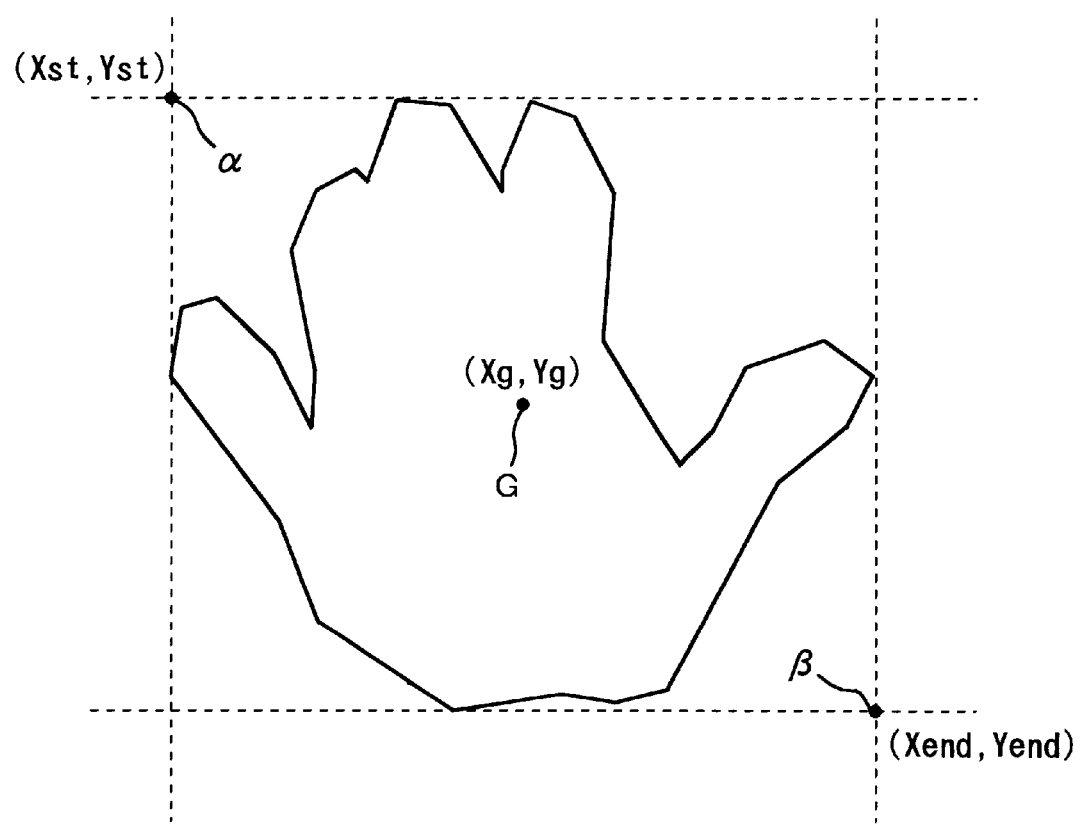
FIG. 8 is a diagram used to explain a method for calculating the center of gravity position of a blob.

Next, the spatial position calculating device 4 obtains the on-image center of gravity positions of the blobs included in the feature images in the first to third channels shown in FIGS. 7(a), (b), (c) (Step S13). Referring to FIG. 8, the method for obtaining the center of gravity position of the blob corresponding to the right hand will be described. First, circumscribed rectangle of the objective blob is obtained, where the coordinates of diagonal vertexes α and β of the circumscribed rectangle are taken as $(X_{st}, Y_{st})$, $(X_{end}, Y_{end})$, respectively. The origin in the coordinates is taken at the upper left of the image as shown in FIGS. 7a to 7c. Now, when the coordinates of the center of gravity G of the blob on the image in FIG. 8 is $(X_g, Y_g)$, then $X_g$ and $Y_g$ can be obtained by the following equations (4) and (5), respectively:

$$X_g = (X_{st} + Y_{end})/2 \quad (4)$$

$$Y_g = (Y_{st} + Y_{end})/2 \quad (5)$$

The center of gravity positions of other blobs are obtained in the same way.

Next, the spatial position calculating device 4 calculates three-dimensional spatial positions of the individual blobs in the first to third channels (Step S14). Now, in a pair of corresponding blobs on the right and left sides, the center of gravity position of the blob sensed by the right camera in the photographing device 1 is taken as $G_R = (X_{gR}, Y_{gR})$ and the center of gravity position of the blob sensed by the left camera is taken as $G_L = (X_{gL}, Y_{gL})$, then the spatial position calculating device 4 calculates the three-dimensional spatial position (Xw, Yw, Zw) of that blob by using the following equations (6) to (8):

$$X_W = \{(X_{gL} + X_{gR})/2\} \times \{d/(X_{gL} - X_{gR})\} \quad (6)$$

$$Y_W = \{d/(X_{gL} - X_{gR})\} \times Y_{gL} \quad (7)$$

$$Z_W = f \times \{d/(X_{gL} - X_{gR})\} \quad (8)$$

In the equations (6) to (8), "d" indicates the distance between the right and left cameras and "f" indicates the focal length. As can be seen from the equations (6) to (8), the spatial position calculating device 4 calculates the three-dimensional spatial positions of the blobs by utilizing the parallax of the feature images outputted from the feature image extracting device 3. The spatial position calculating device 4 records the three-dimensional spatial positions of the blobs calculated in Step S14 in a three-dimensional spatial position table such as shown in FIG. 9.

Although the calculation method has been described on the assumption that the right and left cameras are horizontally positioned, the right and left cameras can be set in an arbitrary position. The equations (6) to (8) can be modified in accordance with the positional relation between the right and left cameras.

Figure 10:
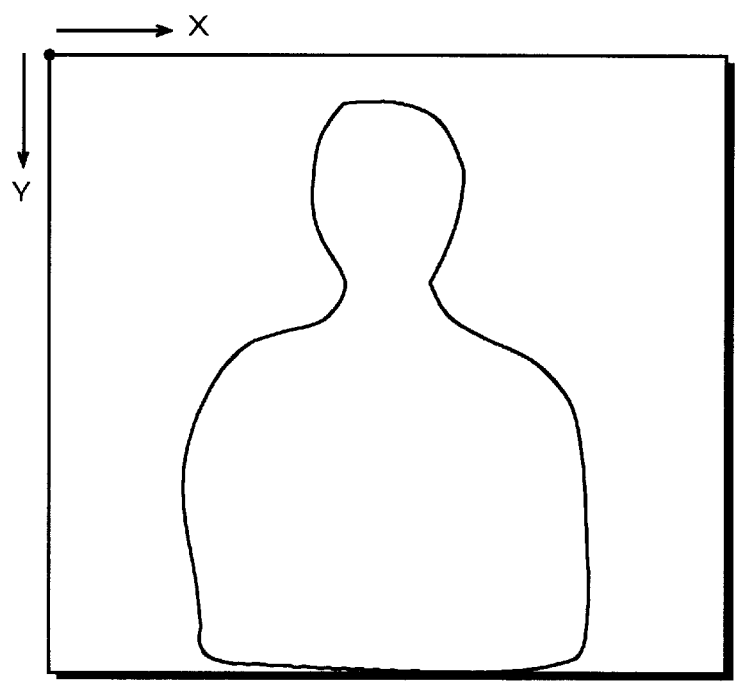
FIG. 10 is a diagram showing the outline shape of a body extracted from the feature image outputted in a third channel.
Figure 11:
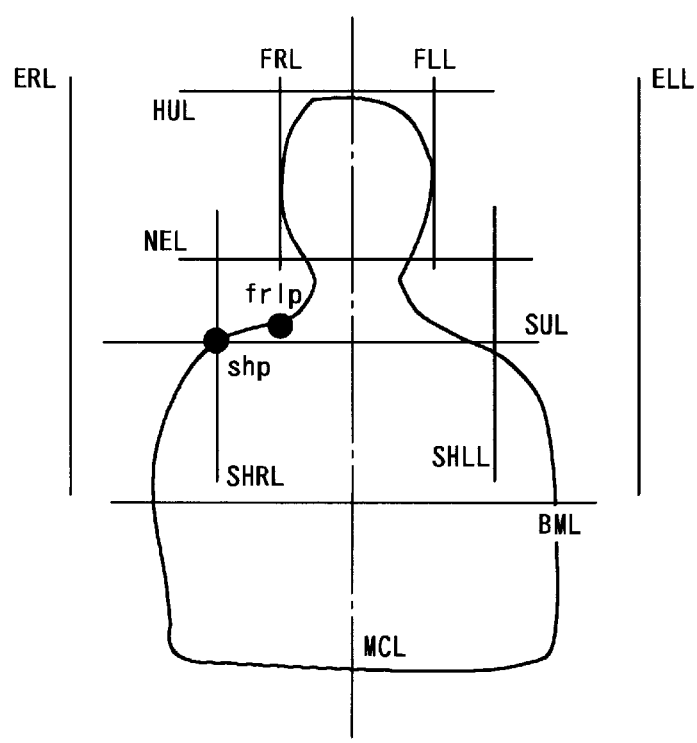
FIG. 11 is a diagram showing representative lines showing body features which are defined for the outline shape of FIG. 10.

Next, the region dividing device 5 extracts the outline of the body as shown in FIG. 10 from the feature image of the third channel shown in FIG. 7c (Step S15). Next, the region dividing device 5 detects representative lines representing body features (see FIG. 11) from the extracted outline (Step S16). In FIG. 11, the line HUL is a line parallel to the X axis and touching the uppermost end of the person's outline, which represents the top of the head of the body. The lines FRL and FLL are lines parallel to the Y axis and touching the right and left ends of the upper part (the upper one-third) of the body outline, which represent the right and left sides of the face. The point at which the vertical extension of the line FRL intersects the outline is taken as frlp (Xf, Yf). The first intersection with the outline found when the image is searched from the left side is taken as tempp (Xt, Yt). The point with the maximum curvature found when the outline is searched from the point frlp to the point tempp is the point shp, which represents the right shoulder. The line SUL is parallel to the X axis and passes through the point shp. The line SHRL is parallel to the Y axis and passes through the point shp. The line MCL is parallel to the Y axis and located at the midpoint between the line FRL and the line FLL, which represents the center axis of the body. The line SHLL is a line symmetric to the line SHRL about the line MCL. The line ERL is a line symmetric to the line MCL about the line SHRL. The line ELL is a line symmetric to the line ERL about the line MCL. The line NEL is a line parallel to the X axis and located at the three-fourths position between the line SUL and the line HUL. The line BML is a line parallel to the X axis and located at the midpoint between the line SUL and the bottom end of the image.

Figure 12:
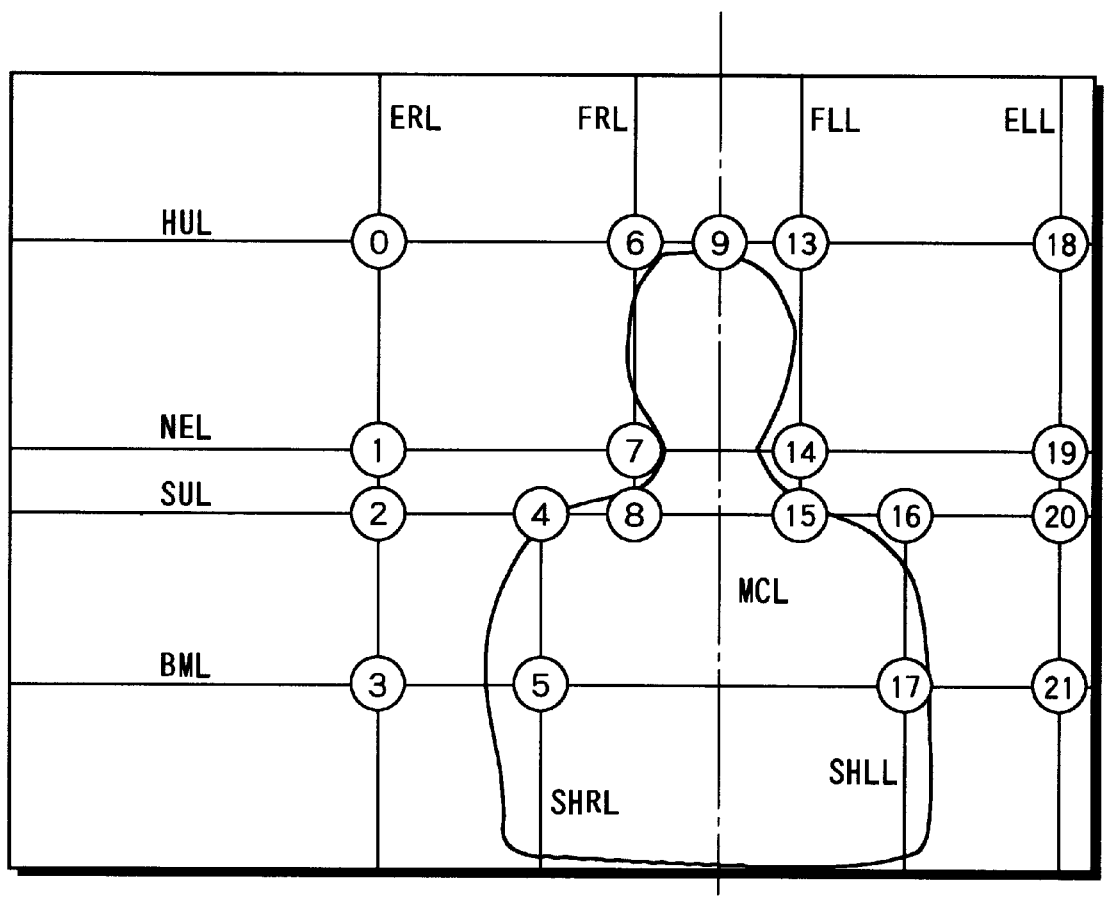
FIG. 12 is a diagram showing spatial regions divided by the representative lines shown in FIG. 11.
Figure 13:
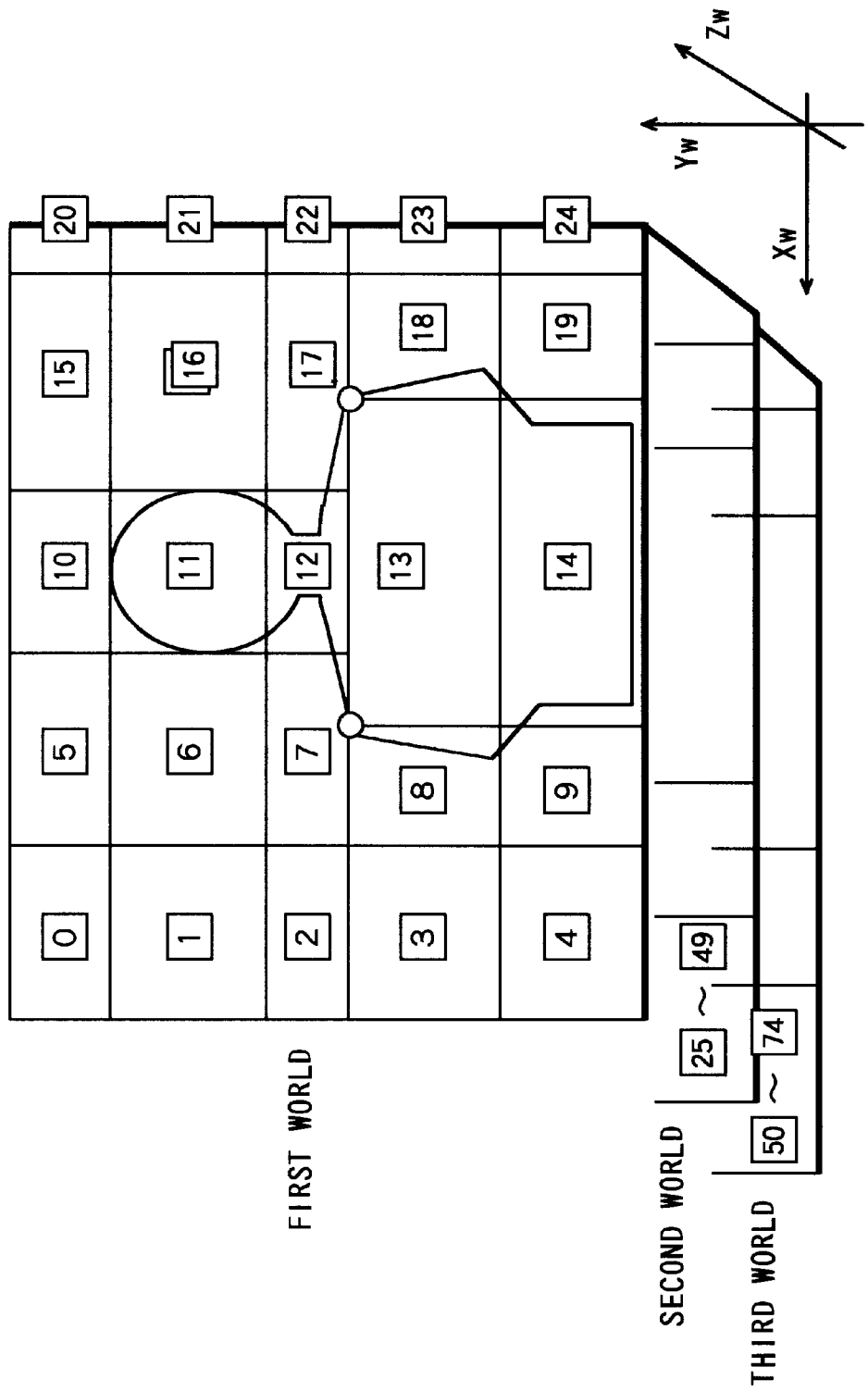
FIG. 13 is a diagram showing spatial region codes defined by a region dividing device 5 of FIG. 1.
Figure 14:
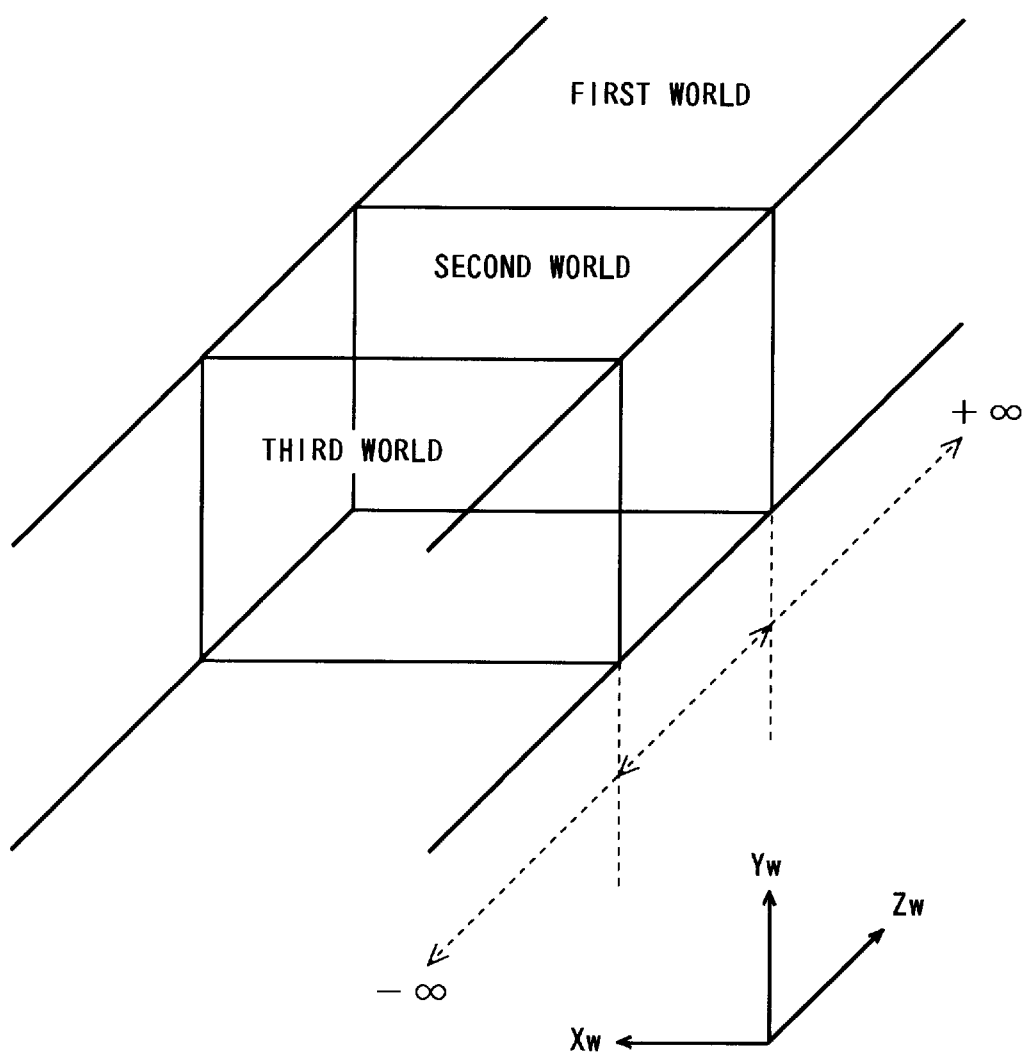
FIG. 14 is a diagram visually showing positional relation among first to third worlds in a three-dimensional space.

Next, the region dividing device 5 obtains the intersections 0 to 21 of the representative lines (see FIG. 12). Next, regarding the points with the same intersection numbers in the images sensed by the right camera and the left camera as corresponding right and left points, the region dividing device 5 calculates the three-dimensional spatial positions about the intersections 0 to 21 similarly to the spatial position calculating device 4 by utilizing the parallax (Step S17). For example, for the intersection No.0, when the coordinate value on the image through the right camera is taken as $(X_{R0}, Y_{R0})$ and the coordinate value on the image through the left camera is taken as $(X_{L0}, Y_{L0})$, the region dividing device 5 substitutes those coordinate values into the above-presented equations (6) to (8) to calculate its three-dimensional spatial position. The three-dimensional spatial positions are calculated in the same way for other intersections. Next, the region dividing device 5 defines spatial region codes (0 to 24) for a first world as shown in FIG. 13 on the basis of the results calculated in Step S17. The region dividing device 5 defines the region extending from the first world in the distance between the line MCL and the line SHRL ahead of the person as second world spatial region codes (25–49) and defines the region further ahead as third world spatial region codes (50–74). FIG. 14 visually shows the positional relation among the first to third worlds defined by the region dividing device 5. Next, the region dividing device 5 stores the defined spatial region codes and the three-dimensional coordinate values of the intersections for defining them in a spatial region code table (not shown) (Step S18). Thus, the regions can be divided in correspondence with the body parts of the user (the face, neck, chest, belly, sides of the face, etc.), with the spatial region codes indicating the correspondence with the body parts of the user.

More desirably, the region dividing device 5 may receive the three-dimensional spatial positions of the blobs corresponding to the hair of the head and the eyes from the spatial position calculating device 4. Then it estimates positions of other elements (the nose, mouth, ears, etc.) constituting the face from the positional relation between the hair and eyes, and divides the spatial region (i.e., the spatial region corresponding to the spatial region code (11) of FIG. 13) into smaller regions on the basis of the estimated positions of other elements. In this case, the region dividing device 5 contains previously recorded general positional relation among the nose, mouth, ears, etc. with respect to the hair and the eyes. When the three-dimensional spatial positions of the blobs corresponding to the hair and eyes are inputted, it estimates the approximate positions of the nose, mouth, ears, etc. in the three-dimensional space on the basis of the previously recorded positional relation among the nose, mouth, ears, etc. Then the region dividing device 5 divides the space into smaller regions on the basis of the estimated positions of the nose, mouth, ears, etc. in the three-dimensional space and defines spatial region codes for defining them.

The region dividing device 5 may be configured to calculate difference values between images adjacent in time in a certain channel (e.g., the third channel) so that it can create the spatial region codes shown in Step S18 only when the difference value is at or over a predetermined threshold. In this case, since the spatial region codes are created only when the user moves largely, the calculating load to the region dividing device 5 is reduced. As shown in FIG. 15, the region dividing device 5 may define the spatial region codes more roughly in greater-numbered worlds, as from first, second, to third worlds, that is, as it moves forward, ahead of the user.

Next, the hand gesture detecting device 6 specifies blobs having size corresponding to the hands from among the blobs obtained in the second channel as the hands, and determines which of the spatial region codes created in Step S18 (see FIG. 13) the three-dimensional spatial positions of the corresponding blobs recorded in the three-dimensional spatial position table of FIG. 9 belong (Step S19). The results of the determination made at this time are recorded in a region transition table such as shown in FIG. 16. The region transition table shown in FIG. 16 contains data recorded when a sign language gesture meaning "postcard" is performed as an example. When the area of a certain blob in the second channel is taken as La, the smallest threshold for the area is taken as $TH_{SM}$, and the biggest threshold is taken as $TH_{BG}$, the hand gesture detecting device 6 determines blobs which satisfy the conditions given by the following expression (9) to be the hands and determines which blobs which satisfy the conditions given by the following expression (10) to be blobs representing other parts:

$$La > TH_{SM} \text{ and } La < TH_{BG} \quad (9)$$

$$La < TH_{SM} \text{ and } La > TH_{BG} \quad (10)$$

From the expressions (9) and (10) above, the blobs 77 and 78 shown in FIG. 7b are determined to be blobs corresponding to the hands, and then the right hand and the left hand are specified.

Next, the hand gesture detecting device 6 determines whether the movement of the blobs corresponding to the hands has rested in a predetermined constant time period or longer (Step S20). When the movement of those blobs is continuing, the operations in Steps S12 to S19 are repeated. Then spatial region codes to which those blobs belong are thus recorded in a time series manner in the region transition table shown in FIG. 16. Accordingly, it can be known how the hands move with respect to the body of the user by seeing the region transition table.

On the other hand, when the movement of the blobs corresponding to the hands has rested over the predetermined constant time period, that is to say, when a sign language gesture corresponding to one word has been ended, the hand gesture detecting device 6 analyzes the spatial region codes recorded in the region transition table (see FIG. 16) and disassembles the movement of the hands into elements to detect the features (Step S21). The following features are detected from the spatial region codes stored in the region transition table of FIG. 16.

| "movement code" | right → down → left |
|---|---|
| "gesture start position code" | 36 |
| "gesture end position code" | 38 |
| "positional relation between line-symmetric hands" | about body |
| "indicated particular part" | X |
| "hand shape" | No. 4 |

| "movement code" | left → down to right → right |
|---|---|
| "gesture start position code" | 36 |
| "gesture end position code" | 13 |
| "positional relation between line-symmetric hands" | about body |
| "indicated particular part" | X |
| "hand shape" | No. 4 |

Figure 17A:
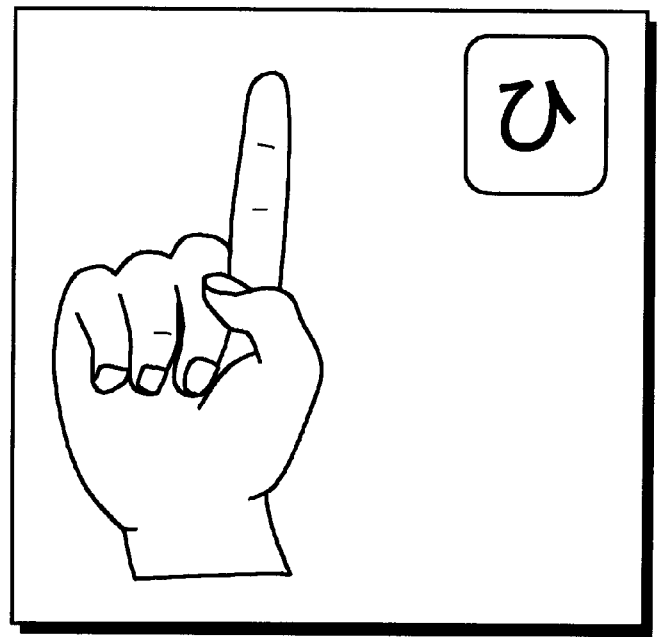
FIGS. 17a and 17b are diagrams showing examples of hand shapes.
Figure 17B:
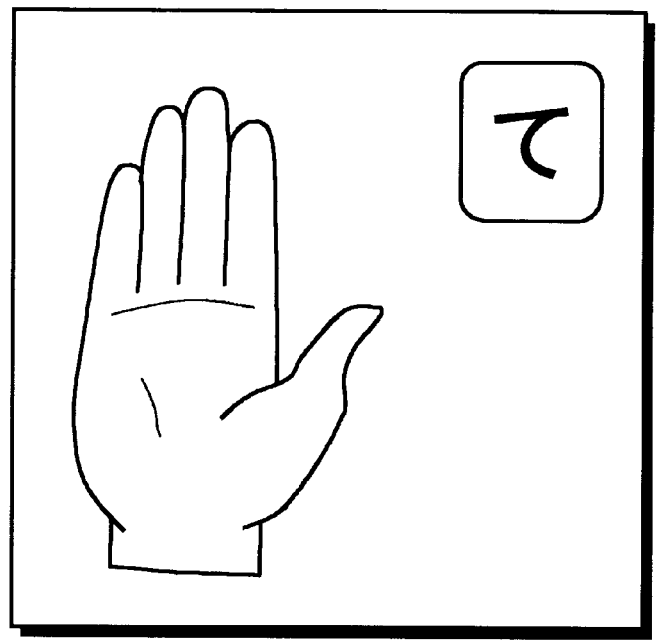

Here, "indicated particular part" shows a particular part of the body indicated by hands in the series of action. The sign "x" shows that no part was indicated. "Hand shape" indicates which of a plurality of predetermined hand shape patterns the hand shape is close to. FIGS. 17a and 17b show examples of the predetermined hand shapes. FIG. 17a shows a hand shape No.4 corresponding to "ひ" (which is a phonogram pronounced as [hi]). FIG. 17b shows a hand shape No.2 corresponding to "て" (which is a phonogram pronounced as [te]).

Figure 18:
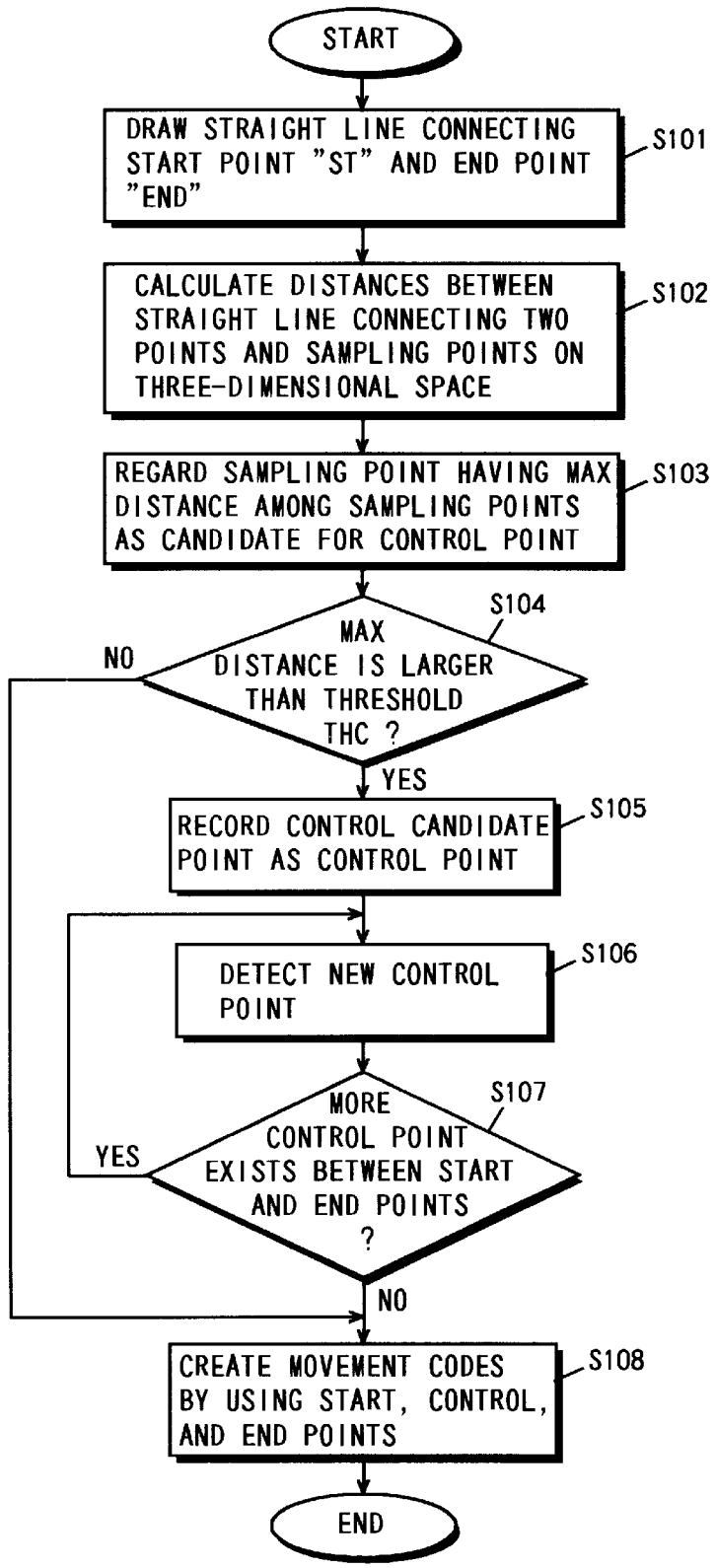
FIG. 18 is a flowchart showing operation of detecting movement codes in the first embodiment of the present invention.

Now referring to the flowchart shown in FIG. 18 and the locus of movement of the hand shown in FIGS. 19a to 19c, the operation of detecting movement codes executed in Step S21 will be described in greater detail.

Figure 19A:
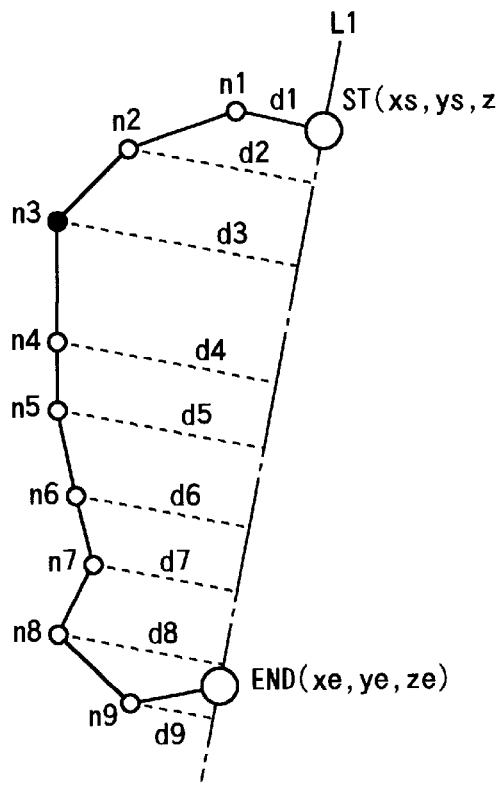
FIGS. 19a to 19c are diagrams showing examples of hand movement loci used to describe control point detecting operation in the first embodiment of the present invention.

As shown in FIG. 19a, the start point of the gesture is taken as ST (xs, ys, zs), and the end point of the gesture is taken as END (xe, ye, ze). The hand gesture detecting device 6 first obtains a straight line L1 connecting the start point ST and the end point END (Step S101). Next, the hand gesture detecting device 6 obtains the perpendicular lines from individual sampling points n1 to n9 to the straight line L1 and obtains the lengths d1 to d9 of the perpendicular lines (Step S102). Referring to the generalized model shown in FIG. 20, the length of the perpendicular line d from an arbitrary sampling point n to the straight line L can be obtained by the following equation (11). Note that the variable "t" in the equation (11) is given by the following equation (12).

$$d = \sqrt{\{(xe-xs)*t+xs-xn\}^2 + \{(ye-ys)*t+ys-yn\}^2 + \{(ze-zs)*t+zs-zn\}^2} \quad (11)$$

$$t = \frac{(xe-xs)(xs-xn) + (ye-ys)(ys-yn) + (ze-zs)(zs-zn)}{(xe-xs)^2 + (ye-ys)^2 + (ze-zs)^2} \quad (12)$$

Accordingly, in Step S102, the length of the perpendicular lines from the individual sampling points n1 to n9 to the straight line L1 are obtained by using the above equation (11).

Next, the hand gesture detecting device 6 takes the sampling point having the longest perpendicular line as a control candidate point (Step S103). In this case, the sampling point n3 having the maximum distance d3 to the straight line L1 is regarded as the control candidate point. Next, the hand gesture detecting device 6 determines whether or not the maximum distance d3 is smaller than a predetermined threshold THC (Step S104). When the maximum distance d3 is equal to or larger than the predetermined threshold THC, the hand gesture detecting device 6 defines this point n3 as a control point (Step S105). In this case, the maximum distance d3 is equal to or larger than the threshold THC and therefore the sampling point n3 is defined as a control point c1.

Next, the hand gesture detecting device 6 detects a new control point between the start point ST and the end point END (Step S106). This operation of detecting a new control point is repeatedly performed until no new control point is detected between the start point ST and the end point END any longer (Step S107).

Figure 19B:
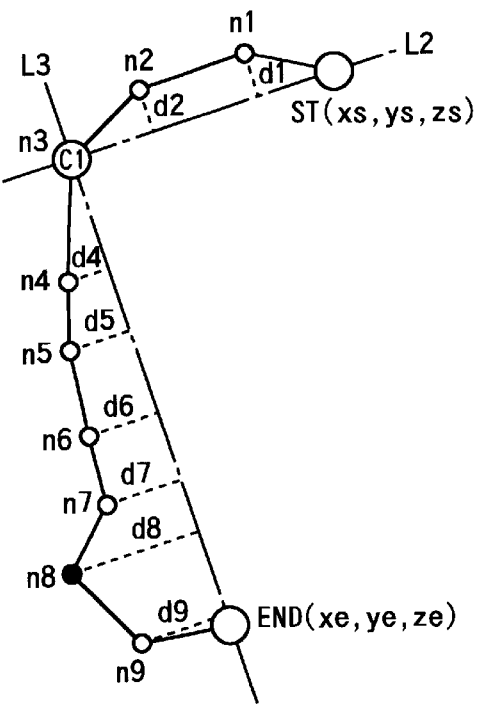

Specifically, as shown in FIG. 19b, the hand gesture detecting device obtains a straight line L2 connecting the start point ST and the control point c1 and a straight line L3 connecting the control point cl and the end point END, and then calculates the distances between the straight line L2 and the individual sampling points n1 and n2 existing between the start point ST and the control point c1 and the distances between the straight line L3 and the individual sampling points n4 to n9 existing between the control point c1 and the end point END by using the above-presented equation (11). Between the start point ST and the control point c1, the sampling point n2 has the maximum distance d2 to the straight line L2 and it is regarded as a control candidate point. However, since this distance d2 is smaller than the threshold THC, the sampling point n2 is not defined as a control point. Hence no control point exists between the start point ST and the control point c1. Between the control point c1 and the end point END, the sampling point n8 has the maximum distance d8 to the straight line L3 and is regarded as a control candidate point. Since this distance d8 is equal to or larger than the threshold THC, the sampling point n8 is defined as a control point c2.

Figure 19C:
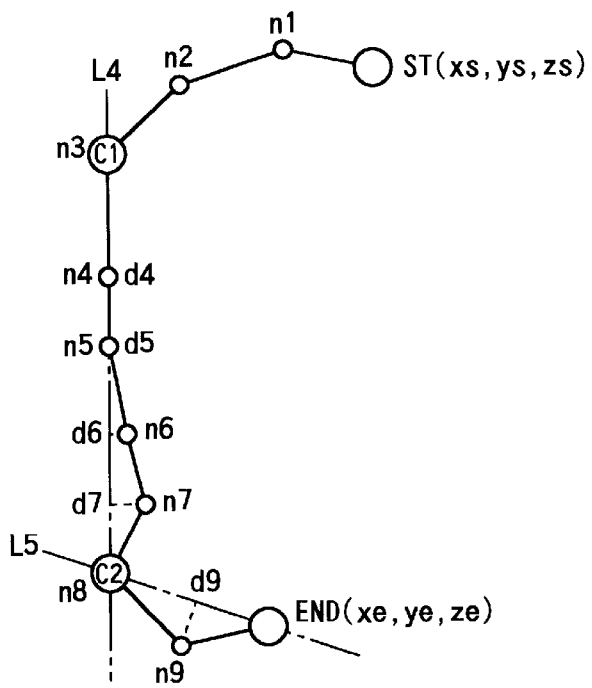

Next, as shown in FIG. 19c, the hand gesture detecting device 6 obtains a straight line L4 connecting the control point c1 and the control point c2 and calculates the distances between the straight line L4 and the individual sampling points n4 to n7 existing therebetween by using the above equation (11). At this time, the sampling point n7 having the maximum distance d7 is regarded as a control candidate point. However, since the distance d7 is shorter than the threshold THC, the sampling point n4 is not defined as a control point. Accordingly no control point exists between the control point c1 and the control point c2. Then, as shown in FIG. 19c, the hand gesture detecting device 6 obtains a straight line L5 connecting the control point c2 and the end point END and calculates the distance d9 between the straight line L5 and the sampling point n9 existing therebetween by using the equation (11). At this time, the sampling point n9 is regarded as the control candidate point because but not defined as a control point, the distance d9 is shorter than the threshold THC. Accordingly no control point exists between the control point c2 and the end point END. That is to say, in the movement of the hand from the start point ST to the end point END, there are two control points c1 and c2.

Next, the hand gesture detecting device 6 creates movement codes by using the start point, the control points, and the end point (Step S108). That it to say, in the case of the locus of the hand shown in FIGS. 19a to 19c, it can be disassembled into the movements of ST→c1, c1→c2, c2→END. Referring to the movement code table shown in FIG. 21 (which is stored in the hand gesture detecting device 6), ST→c1 corresponds to [1. right], c1→c2 to [4. down], c2→END to [2. left], respectively. Accordingly the movement codes are "right→down→left" in this case.

Next, the category detecting device 8 determines which of the categories recorded in the category dictionary 10 the features of the sign language gesture detected by the hand gesture detecting device 6 in Step S19 belong (Step S22). The categories are groups each including a plurality of sign language gestures with similar movements. A plurality of sign language gestures as objects of recognition by this device are classified into a plurality of categories in advance. The category dictionary 10 contains features of the hand gestures in the individual categories recorded in advance. In this embodiment, it is assumed that the category dictionary 10 contains features in categories 1 to 7, for example. The category 1 includes hand gestures in which both hands first come closer and then move symmetrically on the right and left. The category 2 includes hand gestures in which both hands move independently while keeping a certain or larger interval. The category 3 includes hand gestures in which the hands identically move in contact or while being coupled. The category 4 includes hand gestures in which one hand stands still and the other hand moves within a given region from the resting hand. The category 5 includes hand gestures in which one hand stands still and the other moves closer to and comes in contact with the resting hand from an interval equal to or larger than a given region. The category 6 includes hand gestures made by both hands other than those mentioned above. The category 7 includes hand gestures made by one hand only.

When the variation of the spatial region codes recorded in the region transition table of FIG. 16 and the three-dimensional coordinate positions are analyzed, it is seen that both hands are first in contact and then move almost symmetrically on the right and left sides about a center line vertical to the body, and finally come closer again. This movement coincides with the features of the category 1 recorded in the category dictionary 10.

Figure 22A:
FIGS. 22a to 22c are diagrams showing examples of sign language gestures belonging to a first category.
Figure 22B:
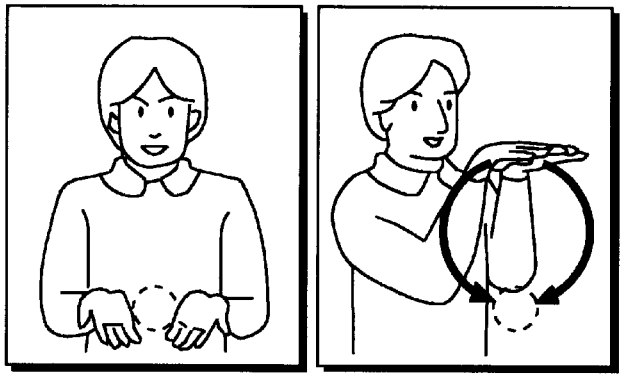
Figure 22C:
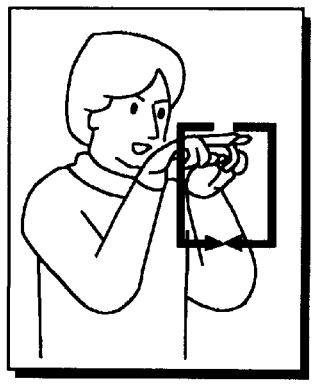

The word dictionary 11 contains more detailed features of the movements for sign language words in the individual categories. FIGS. 22a to 22c show examples of sign language words belonging to the category 1. Although sign language words which satisfy the above-mentioned conditions include not only those shown in FIGS. 22a to 22c but also other words, it is assumed here for simplicity that the three sign language words satisfying the similar conditions, i.e., "postcard," "all," and "almost," belong to the category 1. As shown in FIG. 23, the word dictionary 11 contains information showing features of the movements for the three sign language words belonging to the category 1. That is to say, the word dictionary 11 records information such as "movement code," "gesture start position code," "gesture end position code," "indicated particular part," "positional relation between hands," "hand shape," etc.

The word recognizing device 9 reads, from the word dictionary 11, the feature information about the movements for the sign language words belonging to the category detected by the category detecting device 8 (Step S23). Next, the word recognizing device 9 compares the features of the sign language gesture detected in Step S21 and the feature information about the sign language words read in Step S23 to calculate the degree of coincidence for each sign language word (Step S24).

Figure 24:
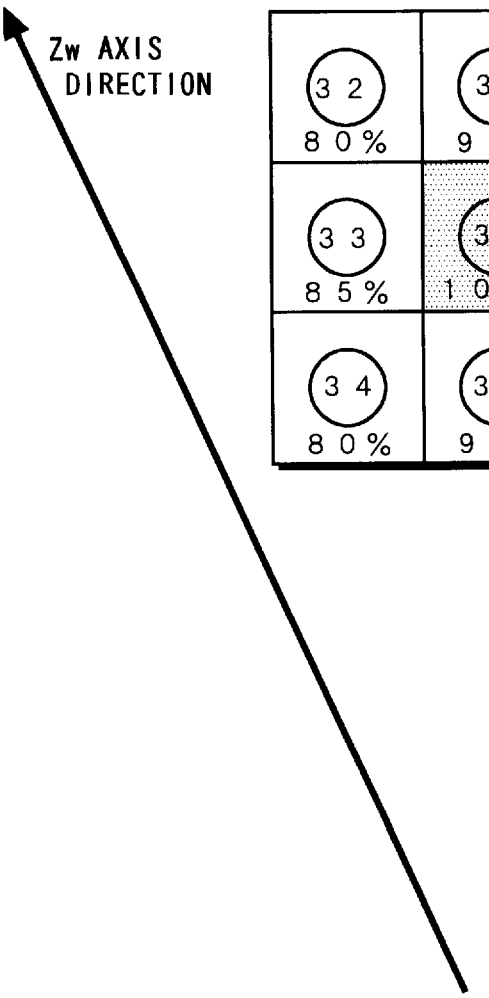
FIG. 24 is a diagram showing degrees of similarity given to spatial region codes which are three-dimensionally close to "gesture start position code" and "gesture end position code" recorded in the word dictionary 11.

At this time, for the "gesture start position code" and "gesture end position code," as shown in FIG. 24, if a spatial position code detected in Step S19 and a spatial region code recorded in the word dictionary 11 perfectly coincide, the degree of similarity is 100%. When they are three-dimensionally close, the degree of similarity is given in accordance with the degree of closeness. For example, as shown in FIG. 16, while the gesture end position code for the left hand detected in Step S19 is "13," the gesture end position code for the left hand for "postcard" shown in FIG. 23 is "38." In this case, as shown in FIG. 24, the degree of similarity for the spatial position code "13" with respect to the spatial position code "38" is 89%. Note that the degrees of similarity shown in FIG. 24 are shown just as examples and that they can be arbitrarily changed. Lower degrees of similarity (e.g., a degree of similarity of 20%) are provided to spatial position codes not shown in FIG. 24, i.e., to spatial position codes separated in space from the spatial position code "38."

Figures 25, 26:
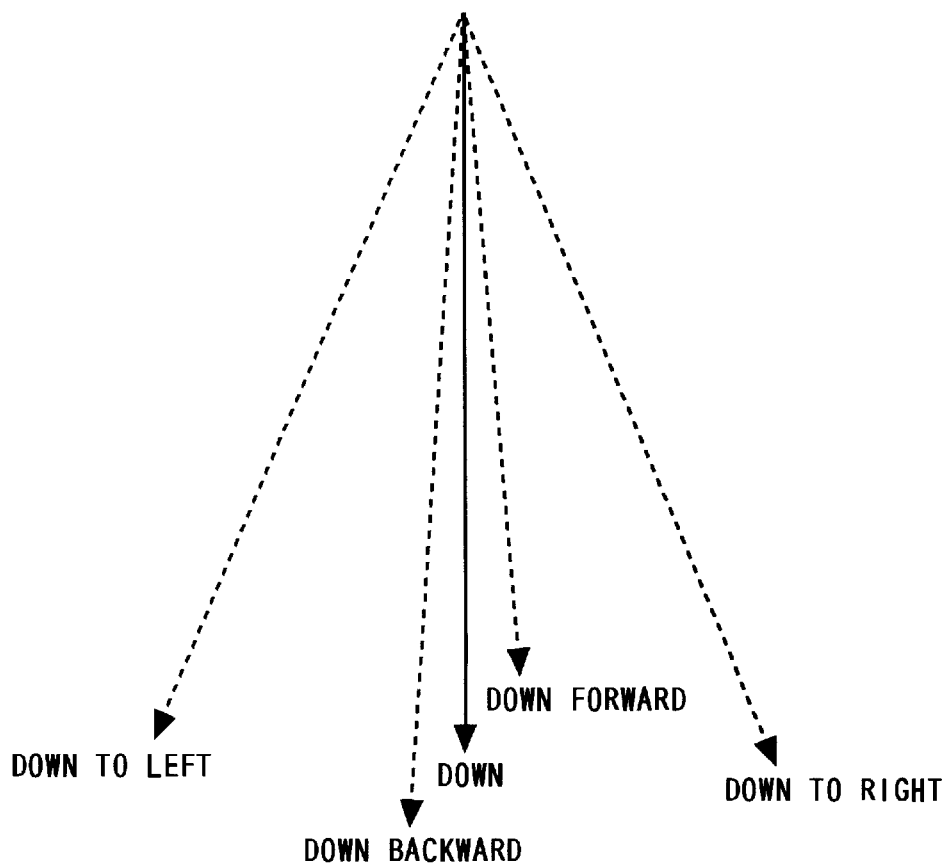
FIG. 25 is a diagram showing part of a movement near-by code table for storing a list of near-by codes for reference movement codes recorded in the word dictionary 11.
FIG. 26 is a diagram visually showing four near-by codes (shown by the dotted lines) for a reference movement code directed downward (shown by the solid line).

For the "movement code," when a movement code recorded in the word dictionary 11 is taken as a reference movement code, four movement codes corresponding to the ridges of a quadrangular pyramid (the lines on which planes intersect on the sides of the quadrangular pyramid) formed around that reference movement code as a center axis are regarded as near-by codes for that reference movement code. Given degrees of similarity (e.g., a degree of similarity of 90%) are assigned to these four near-by codes. Lower degrees of similarity (e.g., a degree of similarity of 20%) are given to other movement codes. FIG. 25 shows part of a movement near-by code table storing a list of near-by codes for reference movement codes. FIG. 26 visually shows four near-by codes (shown by the dotted lines) for a reference movement code directed downward (shown by the solid line). The word recognizing device 9 refers to the near-by code table shown in FIG. 25 to determine whether an actually detected movement code is a near-by code for a reference movement code recorded in the word dictionary 11.

When the spatial region code changes as shown in FIG. 16, the results of analysis made by the hand gesture detecting device 6 in Step S18 are compared with the features of the sign language word "postcard" recorded in the word dictionary 11 to show that the features all coincide with the features of the sign language word "postcard" except that the "gesture end position code for the left hand is "13" and that the second "movement code" of the left hand is "down to right." Accordingly, the degree of similarity in this case is 80.1% (=89%×90%). This degree of similarity is higher than those for the other sign language words "all" and "almost" belonging to the category 1. Hence the word recognizing device 9 determines that the detected sign language gesture corresponds to "postcard" (Step S25). When degrees of similarity for other sign language words are higher, it specifies the sign language word with the highest degree of similarity as the recognized result.

Next, the output device 12 outputs the sign language word "postcard" specified by the word recognizing device 9 in speech, letters, image, or in an arbitrary combination thereof (Step S26). This enables the operator to know the result of recognition.

Next, the feature image extracting device 3 determines whether it has received an instruction to end the recognizing operation from the operator (Step S27). In the case of no instruction, it performs the operation in Step S12 again. The operations in Steps S13 to S26 are then repeated. If it receives an instruction to end from the operator, the color transformation table creating device 13 resets the table setting flag (Step S28). Then the sign language recogninzing device shown in FIG. 1 ends the operation.

Although the word recognizing device 9 in the above-described first embodiment outputs a sign language word with the highest degree of coincidence as the recognized result, it may be configured to output one or a plurality of sign language words having degrees of similarity equal to or larger than a predetermined threshold as the recognized result.

Second Embodiment

While the movement codes for hand gestures are uniquely detected in the first preferred embodiment described above, another embodiment in which the movement codes are hierarchically detected and the sign language words are hierarchically recognized on the basis of the hierarchically detected movement codes will be described below as a second embodiment.

Figure 27:
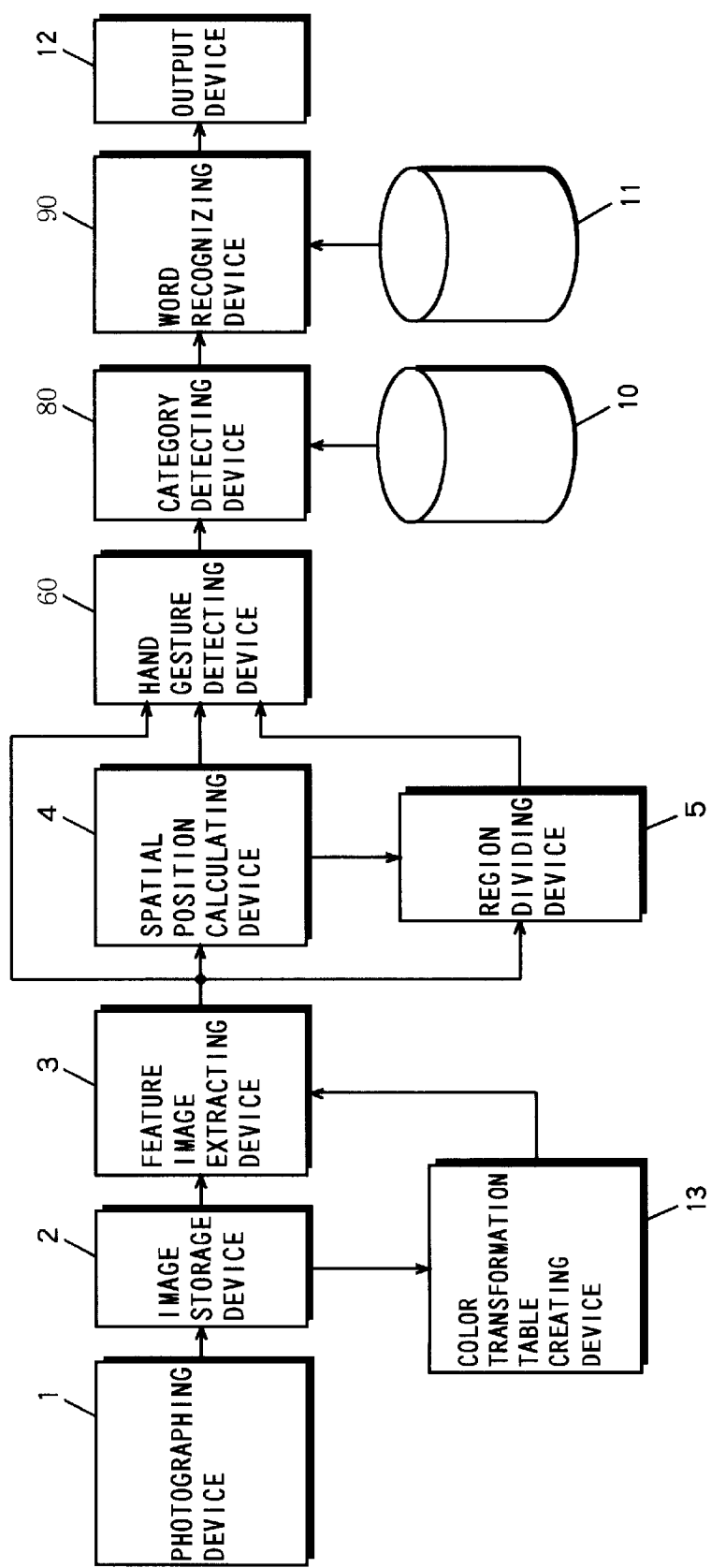
FIG. 27 is a block diagram showing the structure of a sign language recognizing device according to a second embodiment of the present invention.

FIG. 27 is a block diagram showing a structure of a sign language recognizing device according to the second embodiment of the present invention. The structure and operation of this embodiment are the same as those of the first embodiment shown in FIG. 1 except in the following respects, and the corresponding parts are shown by the same reference numerals and are not described again.

FIG. 28 is a flowchart showing the operation of detecting movement codes executed in the hand gesture detecting device 60 of the second embodiment. Here, the movement code detecting operation performed by the hand gesture detecting device 60 will be described on the basis of the hand locus shown in FIGS. 29a and 29b and FIGS. 30a to 30c as an example.

Figures 29A, 29B:
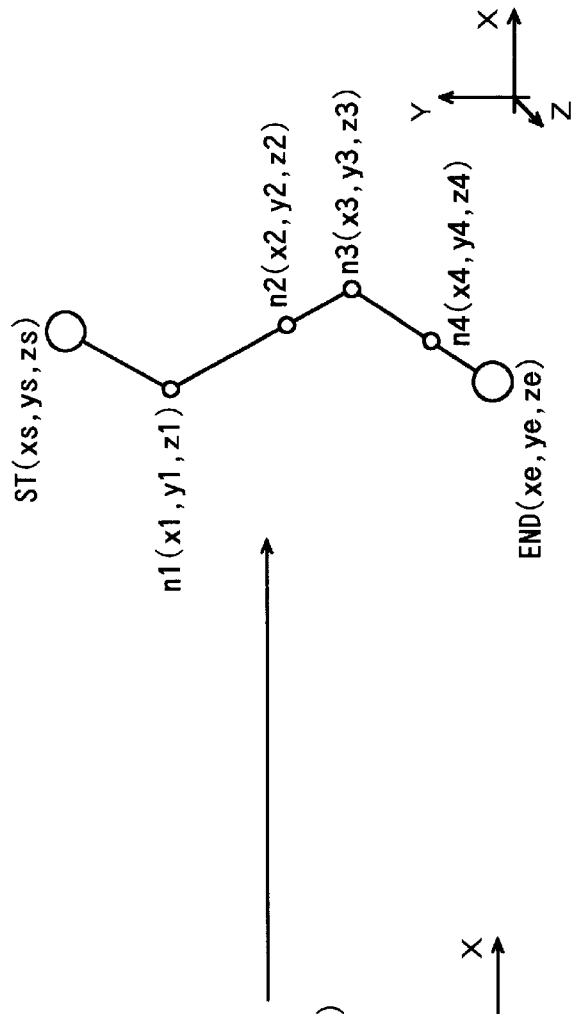
FIGS. 29a and 29b are diagrams showing examples of hand movement loci used to describe an operation performed to detect control points by using a low resolution threshold THC1 in the second embodiment of the present invention.

First, the hand gesture detecting device 60 detects movement codes on the basis of a low resolution threshold THC1 (Step S201). At this time, the hand gesture detecting device 60 detects the movement codes by using the algorithm shown in FIG. 18. That is to say, the hand gesture detecting device 60 obtains the straight line L1 connecting the start point ST and the end point END as shown in FIG. 29a and then calculates the distances d1 to d4 between the straight line L1 and the individual sampling points n1 to n4 by using the above-presented equation (11). Here the sampling point n3 having the maximum distance d3 to the straight line L1 is regarded as a control candidate point. Next, the hand gesture detecting device 60 compares the maximum distance d3 and the low resolution threshold THC1. In this case, since the low resolution threshold THC1 is larger than the maximum distance d3, the sampling point n3 is not defined as a control point. Accordingly, as shown in FIG. 29b, no control point exists when the low resolution threshold THC1 is used.

Next, the hand gesture detecting device 60 represents the hand locus shown in FIG. 29b detected by using the low resolution threshold THC1 as ST→END, and defines the movement code as "down" from the movement code table shown in FIG. 21.

Next, the hand gesture detecting device 60 detects the movement code on the basis of a high resolution threshold THC2 (Step S202). At this time, the hand gesture detecting device 60 detects the movement codes by using the algorithm shown in FIG. 18. The value of the high resolution threshold THC2 is selected to be smaller than the value of the low resolution threshold THC1. That is to say, the hand gesture detecting device 60 obtains the straight line L1 connecting the start point ST and the end point END as shown in FIG. 30a, and then calculates the distances d1 to d4 between the straight line L1 and the individual sampling points n1 to n4 by using the equation (11). At this time, the maximum distance d3 is larger than the distance threshold THC2, and therefore the sampling point n3 is detected as a control point c1. Similarly, as shown in FIG. 30b, the hand gesture detecting device 60 detects a new control point between the start point ST and the control point c1, and further between the control point c1 and the end point END. Here, as shown in FIG. 30c, a new control point c2 is detected between the start point ST and the control point c1. Accordingly, there exist two control points c1 and c2 when the high resolution threshold THC2 is used.

Next, the hand gesture detecting device 60 represents the hand locus shown in FIG. 30c detected by using the high resolution threshold THC2 as ST→c2, c2→c1, c1→END, and defines the movement codes as "down to right→down to left→down to right" from the movement code table shown in FIG. 21.

Figure 31:
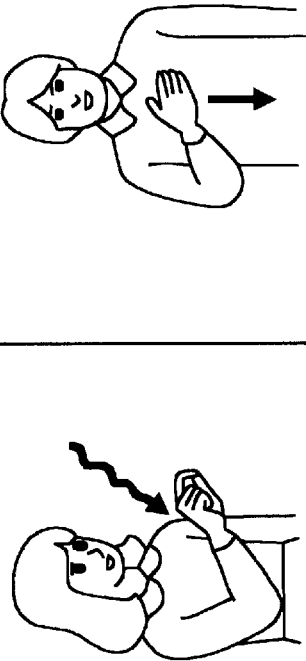
FIG. 31 is a diagram used to describe hierarchical word recognizing operation performed by using hierarchically detected movement codes in the second embodiment of the present invention.

Next, the category detecting device 80 selects the corresponding category by using the movement code "down" detected with the low resolution threshold THC1. Here, both of "write" and "refreshing" in FIG. 31 are selected as candidates for recognition objects.

Next, the word recognizing device 90 selects the corresponding word by using the movement codes "down to right→down to left→down to right" detected with the high resolution threshold THC2. Here the hand gesture word "write" in FIG. 31 is selected.

In this way, by using a plurality of thresholds with different resolutions for movement detection, it is possible to narrow down the objects with large movement first and then specify the gesture with detailed movement.

The low resolution threshold THC1 and the high resolution threshold THC2 can arbitrarily be selected as long as the relation THC1>THC2 holds. Three or more thresholds may be used.

Third Embodiment

Figure 32:
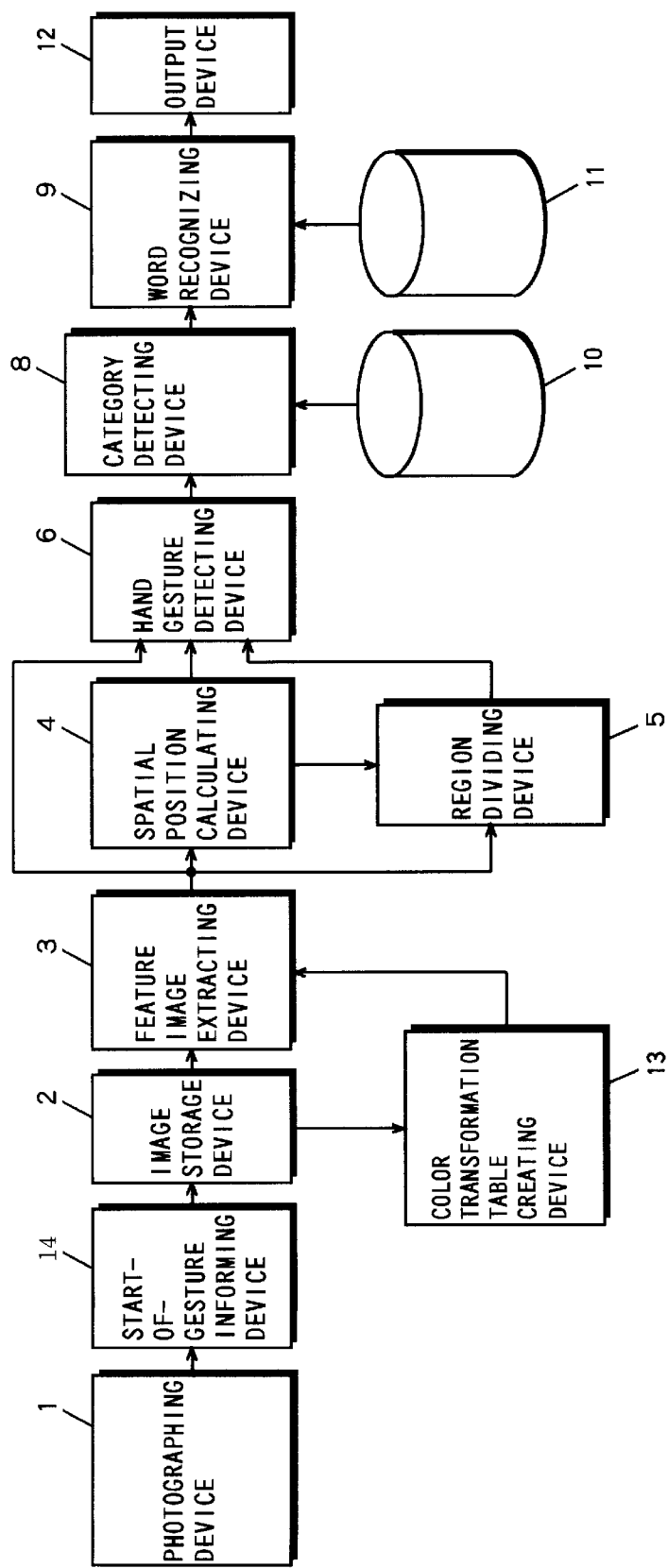
FIG. 32 is a block diagram showing the structure of a hand gesture recognizing device according to a third embodiment of the present invention.

FIG. 32 is a block diagram showing the structure of a sign language recognizing device according to a third embodiment of the present invention. In FIG. 32, the sign language recognizing device of this embodiment additionally has a start-of-gesture informing device 14 between the photographing device 1 and the image storage device 2. This structure is the same as that of the first embodiment shown in FIG. 1 in other respects, and corresponding parts are shown by the same reference numerals and are not described again. This start-of-gesture informing device 14 usually gates image frames outputted from the photographing device 1 to inhibit supply of image frames to the image storage device 2. When an operator gives an instruction to start the recognizing operation, the start-of-gesture informing device 14 informs the user when to start the recognizing operation by light, speech, image, or the like. This allows the user to appropriately time the start of the sign language gesture. The start-of-gesture informing device 14 supplies image frames outputted from the photographing device 1 to the image storage device 2 in response to the starting instruction from the operator. Then image frames are accumulated in the image storage device 2 and the processing for recognizing sign language gestures starts.

Figure 33:
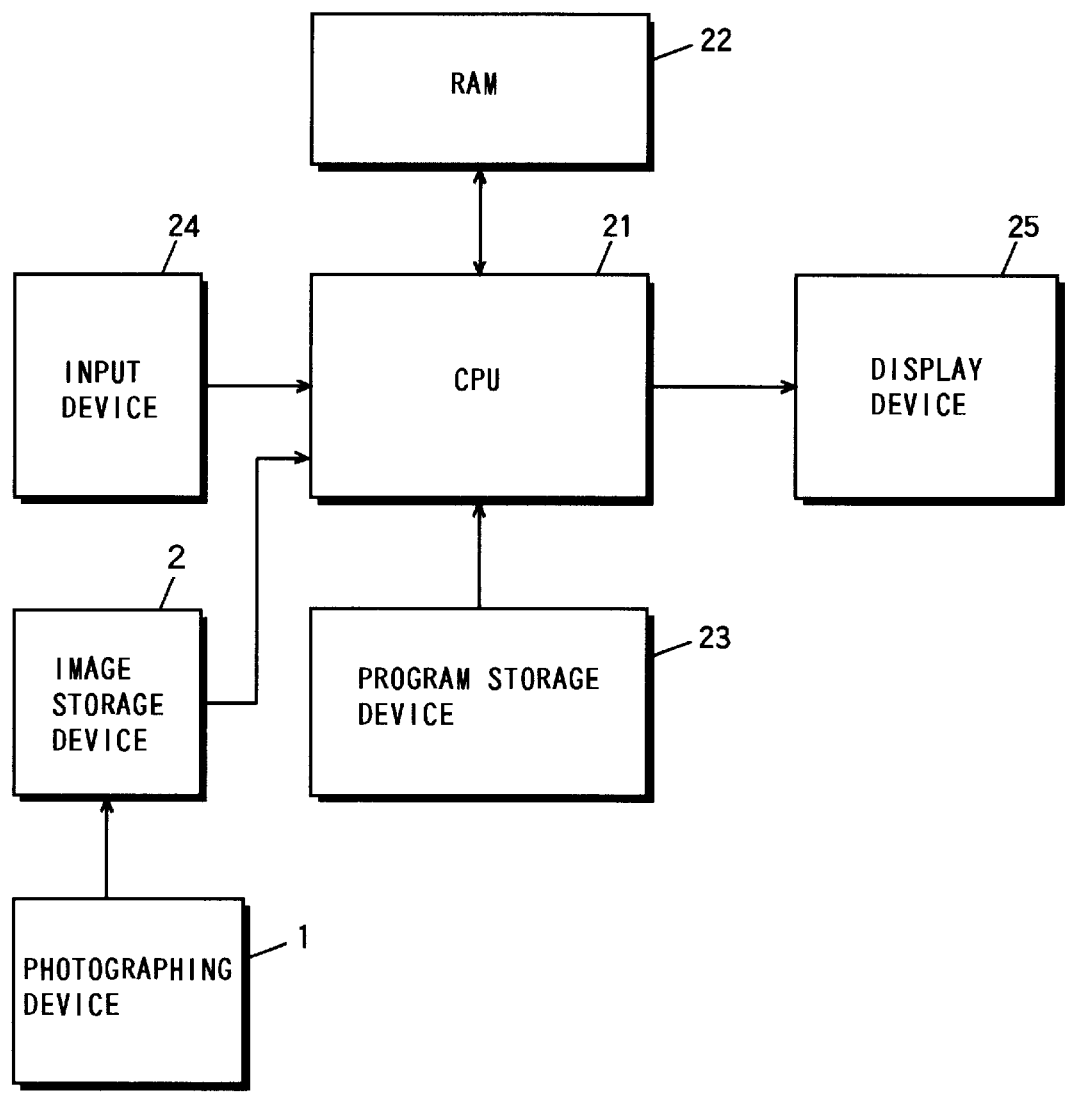
FIG. 33 is a block diagram showing the structure of a hand gesture recognizing device according to the third embodiment of the present invention, which is realized by software control using a computer device.

The embodiments have been described in the form of a functional block diagram. However, as shown in FIG. 33, the embodiments can be realized by software control using a computer device. In FIG. 33, this computer device includes a photographing device 1, an image storage device 2, a CPU 21, a RAM 22, a program storage device 23, an input device 24, and a display device 25. The program storage device 23 contains program data for realizing operations like those shown in the flowcharts in FIGS. 2 and 3. The CPU 21 executes the operations shown in FIGS. 2 and 3 in accordance with the program data. The RAM 22 stores work data generated during the processing by the CPU 21. The input device 24 includes a keyboard, a mouse, and the like, which enters various instructions and data into the CPU 21 in response to operation by an operator. The photographing device 1 and the image storage device 2 have the same configurations as the photographing device 1 and the image storage device 2 shown in FIG. 1.

Here, the method for storing the program data in the program storage device 23 includes various methods. In a first method, the program data is read from a storage medium (a floppy disk, a CD-ROM, a DVD, etc.) containing the program data and stored in the program storage device 23. In a second method, program data transferred by on-line communication are received and stored in the program storage device 23. In a third method, program data is stored in the program storage device 23 in advance, at the time of shipment of the device.

Although the embodiments described above are all configured as devices for recognizing sign languages, the present invention can be applied in various ways not only to recognize sign languages but also to recognize any meaningful hand gestures.

While the invention has been described in detail, the foregoing description is in all aspects illustrative and not restrictive. It is understood that numerous other modifications and variations can be devised without departing from the scope of the invention.

What is claimed is:

1. A hand gesture recognizing device for recognizing hand gestures performed by a user, comprising:

a photographing device having at least two cameras and operable to take stereoscopic pictures of the user;

an image storage device operable to store stereoscopic image data of the user outputted from the photographing device at an arbitrary sampling interval;

a feature image extracting device operable to remove the stereoscopic image data in order from the image storage device, extract a feature image showing body features of the user from each of the stereoscopic image data, and disassemble and output the feature image in a plurality of channels;

a spatial position calculating device operable to detect three-dimensional spatial positions of body parts of the user based on a parallax of the feature image outputted from said feature image extracting device;

a region dividing device operable to divide a space surrounding the user into a plurality of regions related to the body of the user based on the parallax of the feature image outputted from said feature image extracting device;

a hand gesture detecting device operable to detect how three-dimensional spatial positions corresponding to hands of the user, in the three-dimensional spatial positions of the body parts calculated by said spatial position calculating device, move with respect to the regions divided by said region dividing device;

a hand gesture word determining device operable to determine a corresponding hand gesture word based on the movement of the hands detected by said hand gesture detecting device; and an output device operable to output a result determined by said hand gesture word determining device in a form which can be recognized by an operator.

2. The hand gesture recognizing device according to claim 1, wherein said feature image extracting device is operable to output the feature image in said corresponding channels based on color information of individual picture elements forming the stereoscopic image data.

3. The hand gesture recognizing device according to claim 2, wherein said feature image extracting device is operable to set a color transformation table for each of said channels based on a color to be extracted and a color not to be outputted which are specified by the operator, transform the color information of the individual picture elements forming the stereoscopic image data according to the color transformation table, and discriminate values transformed according to the color transformation table with a predetermined threshold to output the feature image in said corresponding channels.

4. The hand gesture recognizing device according to claim 1, wherein said region dividing device is operable to estimate a position of a body part which does not appear in the feature image based on the three-dimensional spatial positions of the body parts calculated by said spatial position calculating device and divide the space surrounding the user into still smaller regions based on the estimated position.

5. The hand gesture recognizing device according to claim 1, wherein said region dividing device is operable to calculate a difference value between the feature images adjacent in time and perform the process of dividing regions only when the difference value is equal to or larger than a predetermined threshold.

6. The hand gesture recognizing device according to claim 1, wherein said region dividing device is operable to divide a space extending in front of and in rear of the body of the user into a plurality of layers and further to divide each of the layers into a plurality of regions.

7. The hand gesture recognizing device according to claim 6, wherein said region dividing device is operable to divide the layers into different numbers of regions.

8. The hand gesture recognizing device according to claim 7, wherein said region dividing device is operable to divide the layers into decreasing numbers of regions as going forward, seen from the body of the user, from a backmost layer to a front layer.

9. The hand gesture recognizing device according to claim 1, wherein a plurality of hand gesture words as objects of recognition are classified into a plurality of categories in advance, and wherein said hand gesture word determining device comprises:

a category dictionary in which features of movements common among hand gesture words belonging to respective categories are previously recorded for each of the categories, a word dictionary in which more detailed features of the movements of individual hand gesture words are stored for each of the categories, a category detecting device operable to detect which of the categories the movement of the hands detected by said hand gesture detecting device belongs to, from the category dictionary, and a word recognizing device operable to recognize which of the hand gesture words belonging to the category detected by said category detecting device corresponds to the movement of the hands detected by said hand gesture detecting device.

10. The hand gesture recognizing device according to claim 9, wherein sandwort recognizing device is operable to output, as a recognition result, one hand gesture word having a highest degree of similarity with respect to the movement of the hands detected by said hand gesture detecting device from among the hand gesture words belonging to the category detected by said category detecting device.

11. The hand gesture recognizing device according to claim 9, wherein sandwort recognizing device outputs, as a recognition result, one or a plurality of hand gesture words having a degree of similarity equal to or higher than a given threshold with respect to the movement of the hands detected by said hand gesture detecting device from among the hand gesture words belonging to the category detected by said category detecting device.

12. The hand gesture recognizing device according to claim 1, further comprising a start-of-gesture informing device operable to inform the user when to start a hand gesture.

13. The hand gesture recognizing device according to claim 1, wherein said hand gesture detecting device is operable to extract a sampling point at which a direction of movement changes greatly as a control point from among sampling points showing three-dimensional spatial positions detected between a start point and an end point of the movement and to represent the hand movement of the user by using the start point, the end point, and the control point.

14. The hand gesture recognizing device according to claim 13, wherein said hand gesture detecting device is operable to detect:

a sampling point existing between the start point and the end point, having a maximum distance, which is equal to or larger than a predetermined threshold, to a straight line connecting the start point and the end point, a sampling point existing between the start point and AN adjacent control point, having a maximum distance, which is equal to or larger than the predetermined threshold, to a straight line connecting the start point and the adjacent control point, a sampling point existing between the end point and an adjacent control point, having a maximum distance, which is equal to or larger than the predetermined threshold, to a straight line connecting the end point and the adjacent control point, and a sampling point existing between two adjacent control points, having a maximum distance, which is equal to or larger than the predetermined threshold, to a straight line connecting said two adjacent control points; and further operable to define these detected sampling points as the control points.

15. The hand gesture recognizing device according to claim 14, wherein said hand gesture detecting device is operable to hierarchically detect the control points by using a plurality of thresholds to hierarchically represent the hand movement of the user, and said hand gesture word determining device is operable to hierarchically specify a corresponding hand gesture word on the basis of the hand movement of the user hierarchically represented by said hand gesture detecting device.

* * * * *